US009450772B2

(12) United States Patent
Zhang

(10) Patent No.: US 9,450,772 B2
(45) Date of Patent: Sep. 20, 2016

(54) METHOD, GROUP SERVER, AND MEMBER DEVICE FOR ACCESSING MEMBER RESOURCES

(71) Applicant: Huawei Technologies Co., Ltd., Shenzhen, Guangdong (CN)

(72) Inventor: Yongjing Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 64 days.

(21) Appl. No.: 14/305,745

(22) Filed: Jun. 16, 2014

(65) Prior Publication Data

US 2014/0369251 A1    Dec. 18, 2014

Related U.S. Application Data

(63) Continuation of application No. PCT/CN2012/078531, filed on Jul. 12, 2012.

(30) Foreign Application Priority Data

Jan. 6, 2012    (CN) .......................... 2012 1 0004135

(51) Int. Cl.
*H04L 12/18*    (2006.01)
*H04W 4/08*    (2009.01)
*H04L 29/12*    (2006.01)
*H04W 4/00*    (2009.01)

(52) U.S. Cl.
CPC ......... *H04L 12/185* (2013.01); *H04L 12/1877* (2013.01); *H04L 61/2069* (2013.01); *H04W 4/005* (2013.01); *H04W 4/08* (2013.01)

(58) Field of Classification Search
None
See application file for complete search history.

(56) References Cited

U.S. PATENT DOCUMENTS

| 6,654,796 | B1 | 11/2003 | Slater |
| 7,053,790 | B2 | 5/2006 | Jang et al. |
| 2005/0207414 | A1 | 9/2005 | Duvvury |
| 2006/0050659 | A1* | 3/2006 | Corson ................. H04W 8/186 370/310 |

(Continued)

FOREIGN PATENT DOCUMENTS

| CN | 102130773 A | 1/2010 |
| CN | 101827309 A | 9/2010 |

(Continued)

OTHER PUBLICATIONS

A. Rahman, et al., "Group Communication for CoAP", CoRE, Jul. 8, 2011, 30 pages.

(Continued)

*Primary Examiner* — Hassan Kizou
*Assistant Examiner* — Deepa Belur

(57) ABSTRACT

The present invention provides a method, a group server, and a member device for accessing member resources. By using an established mapping relationship between a multicast address and a fanout URI in a group resource, a member resource access request may be sent by multicast to member devices having member resources in the group resource, and the fanout URI is included in the member resource access request, so that the member devices having the member resources execute, according to access paths of the member resources on the member devices as indicated by the fanout URI, an operation indicated by the member resource access request. Therefore, the group server does not need to unicast the access request to each member device, and network overheads are saved.

15 Claims, 13 Drawing Sheets

(56) References Cited

U.S. PATENT DOCUMENTS

| | | | |
|---|---|---|---|
| 2006/0053225 A1* | 3/2006 | Poikselka | H04L 12/1818 709/227 |
| 2009/0157798 A1* | 6/2009 | Laumen | H04W 4/08 709/203 |
| 2009/0204972 A1* | 8/2009 | Brice, Jr. | G06F 3/0622 718/104 |
| 2011/0201365 A1 | 8/2011 | Segura | |
| 2011/0235551 A1 | 9/2011 | Kakivaya et al. | |
| 2012/0066396 A1* | 3/2012 | Kang | H04L 12/1868 709/226 |
| 2012/0106431 A1 | 5/2012 | Wu et al. | |
| 2013/0198340 A1* | 8/2013 | Ukkola | H04L 67/02 709/219 |
| 2013/0272186 A1* | 10/2013 | Mohanty | H04W 4/06 370/312 |
| 2013/0346504 A1 | 12/2013 | Huang et al. | |
| 2014/0126581 A1* | 5/2014 | Wang | H04W 4/001 370/431 |
| 2014/0359131 A1* | 12/2014 | Seed | H04L 47/125 709/226 |

FOREIGN PATENT DOCUMENTS

| | | |
|---|---|---|
| CN | 102111741 A | 6/2011 |
| EP | 2 523 528 A1 | 11/2012 |
| KR | 1020040009560 | 1/2004 |
| RU | 2118051 C1 | 8/1998 |
| RU | 2400806 C2 | 9/2010 |
| WO | WO 2011/006437 A1 | 1/2011 |
| WO | WO 2011/137788 A1 | 11/2011 |
| WO | WO 2012050391 A1 * | 4/2012 ............ H04W 4/005 |

OTHER PUBLICATIONS

"Shared Group XDM Specification, Candidate Version 1.0", Open Mobile Alliance, Aug. 10, 2009, 38 pages.

Z. Shelby, et al., "Constrained Application Protocol (CoAP)", CoRE Working Group, Jul. 8, 2011, 86 pages.

D. Estrin, et al., "Protocol Independent Multicast-Sparse Mode (PIM-SM): Protocol Specification", Network Working Group, Jun. 1998, 58 pages.

"Machine-to-Machine communications (M2M); Functional architecture", Draft ETSI TS 102 690 v0.14.2, Sep. 2011, 288 pages.

"Machine-to-Machine communications (M2M); mIa, dIa and mId interfaces", Draft ETSI TS 102.921 v<0.7.3>, Jul. 2011, 216 pages.

Z. Albanna, et al., "IANA Guidelines for IPv4 Multicast Address Assignments", Network Working Group, Aug. 2001, 8 pages.

R. Hinden, et al., "IP Version 6 Addressing Architecture", Network Working Group, Feb. 2006, 25 pages.

A. Rahman, et al., "Group Communication for CoAP", CoRE, Oct. 12, 2011, 35 pages.

Z. Shelby, et al., "Constrained Application Protocol (CoAP)", CoRE Working Group, Nov. 1, 2011, 88 pages.

"Machine-to-Machine communications (M2M); Functional architecture", ETSI TS 102 690 V1.1.1, Oct. 2011, 9 pages.

* cited by examiner

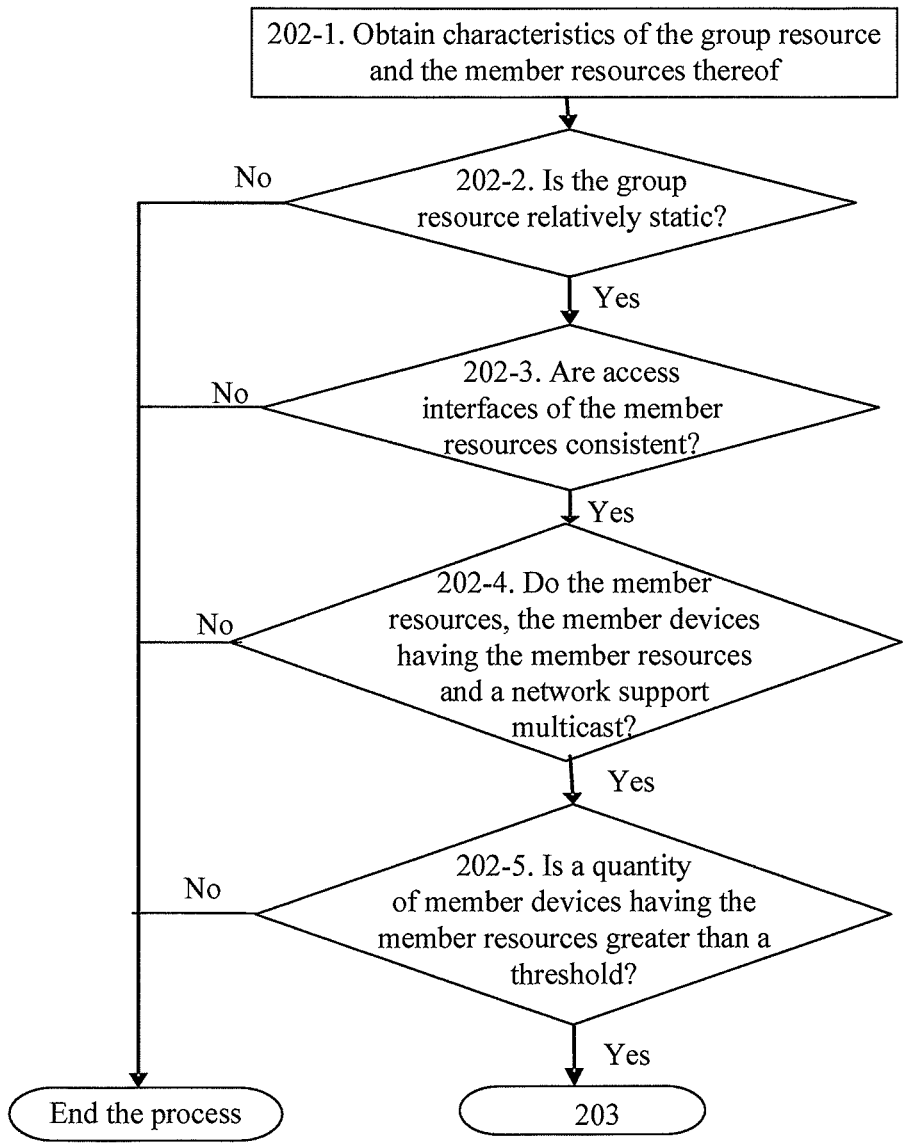
FIG. 2-A
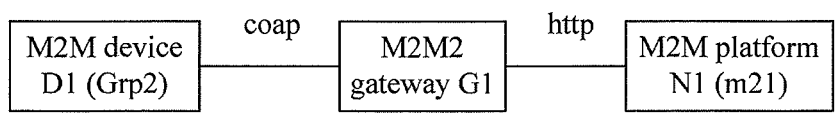
FIG. 2-B

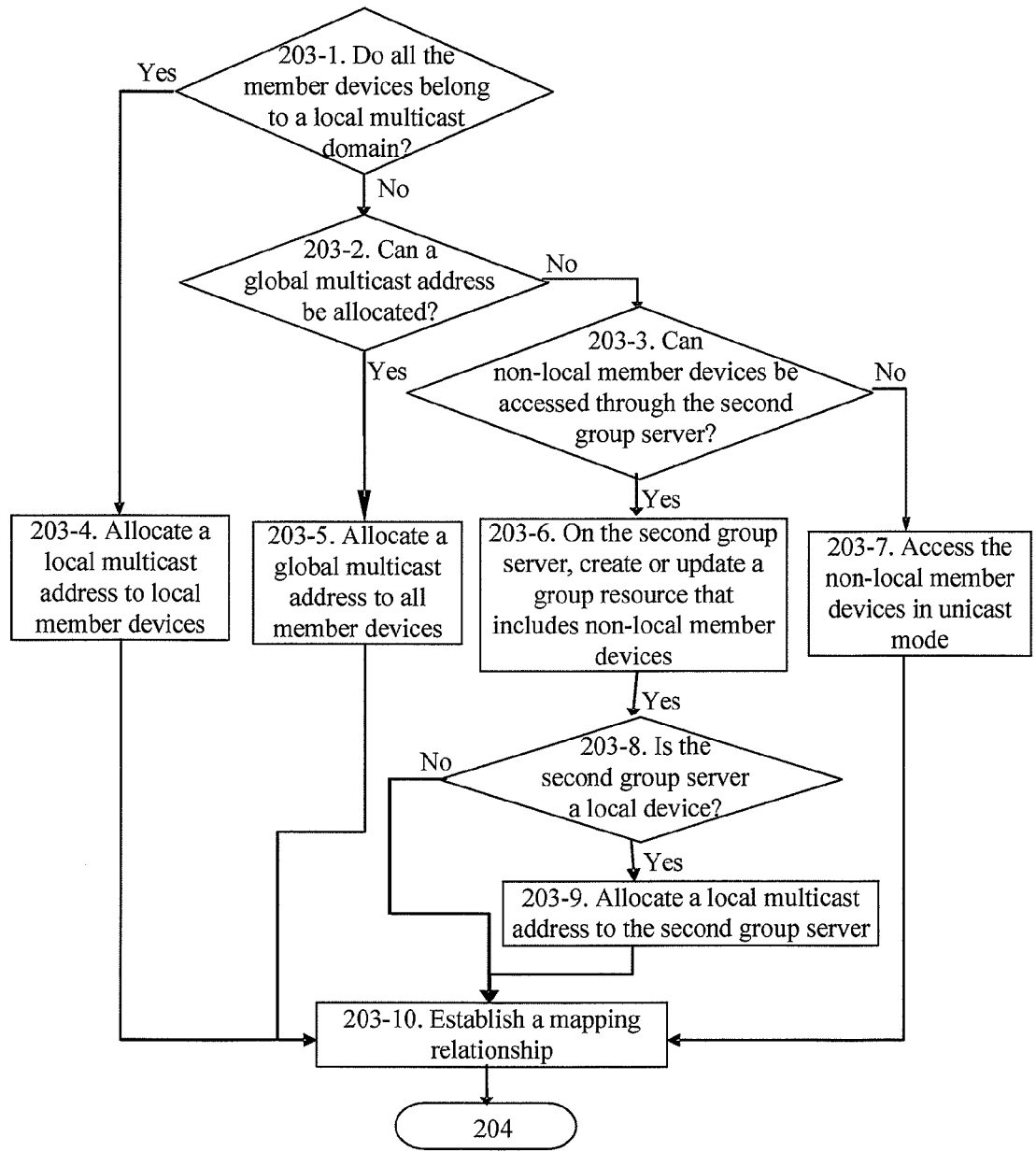
FIG. 2-C

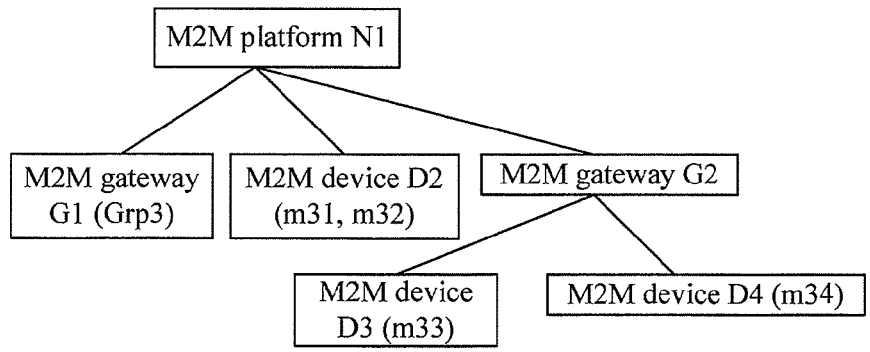
FIG. 2-D
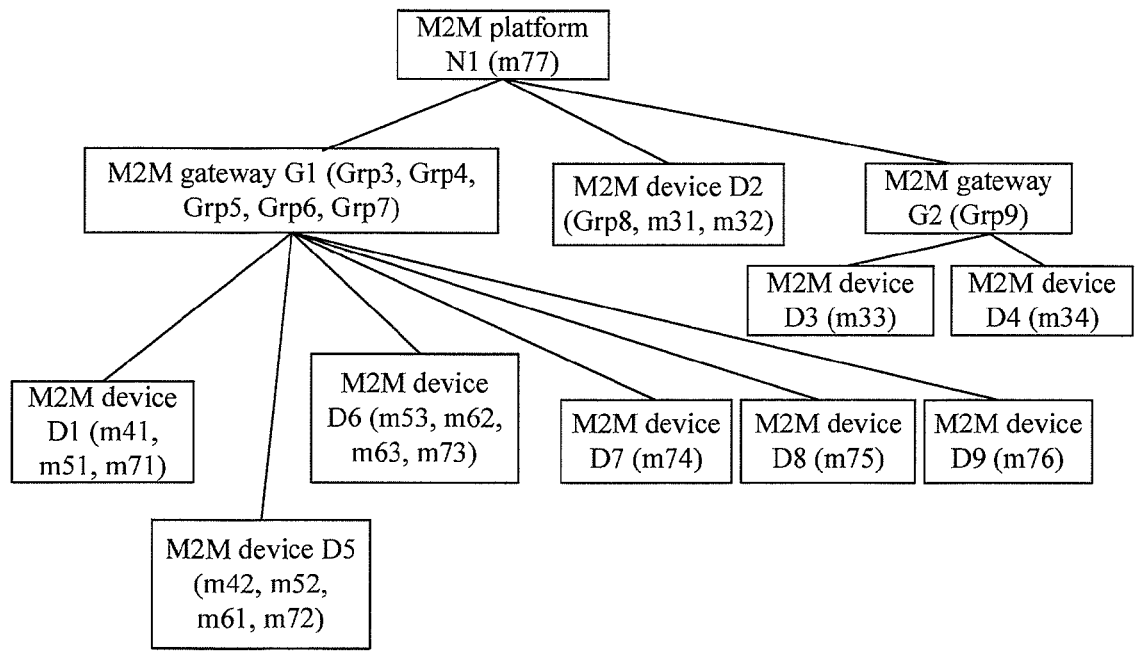
FIG. 2-E

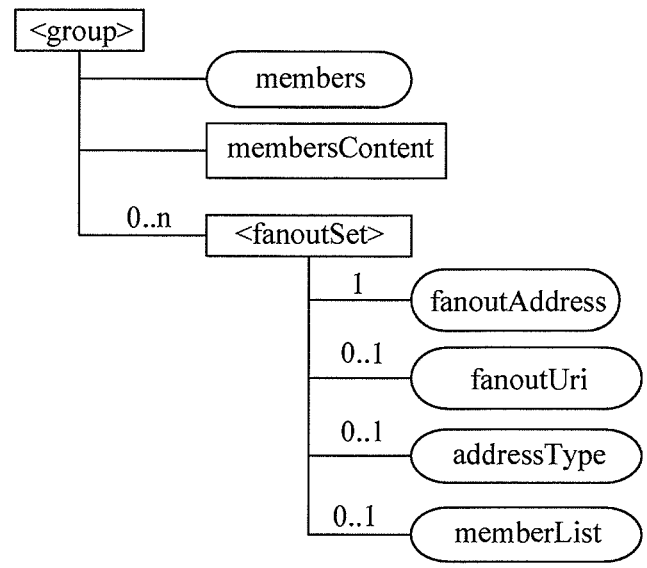
FIG. 2-F
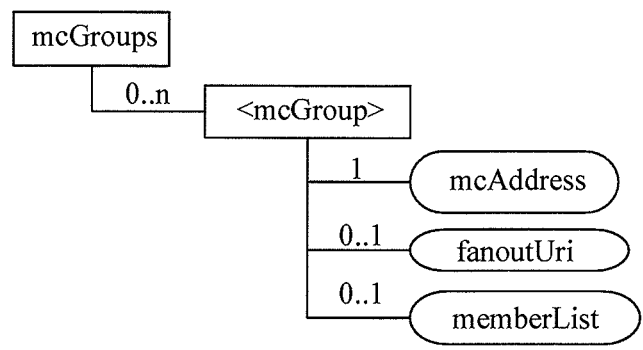
FIG. 2-G

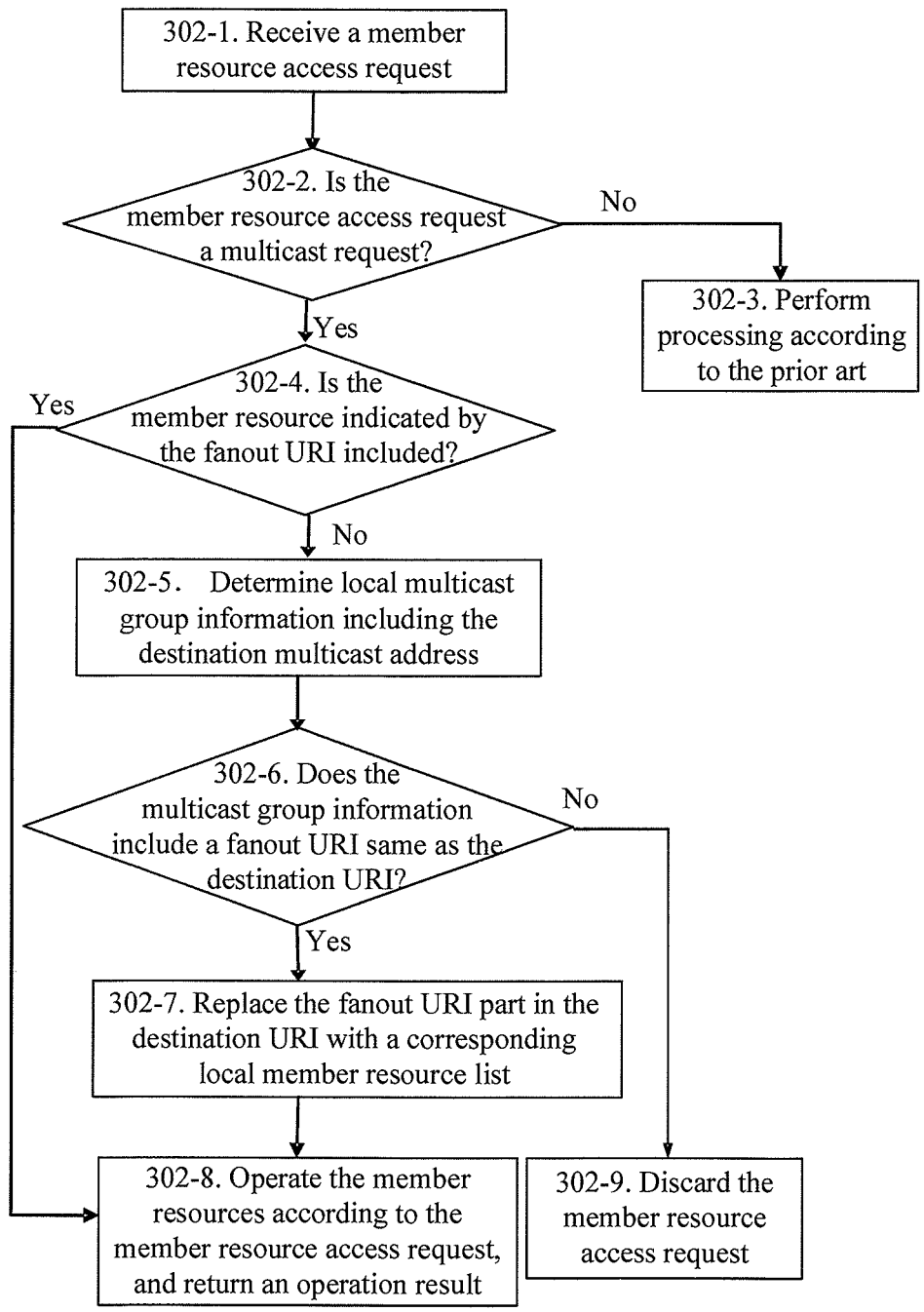
FIG. 3-A

METHOD, GROUP SERVER, AND MEMBER DEVICE FOR ACCESSING MEMBER RESOURCES

CROSS-REFERENCE TO RELATED APPLICATION

This application is a continuation of International Application No. PCT/CN2012/078531, filed on Jul. 12, 2012, which claims priority to Chinese Patent Application No. 201210004135.6, filed on Jan. 6, 2012, both of which are hereby incorporated by reference in their entireties.

TECHNICAL FIELD

The present invention relates to the field of a machine-to-machine communications (Machine-to-Machine Communications, M2M) technology, and in particular, to a method, a group server, and a member device for accessing member resources.

BACKGROUND

Machine-to-machine communications (Machine-to-Machine Communications, M2M) is a network-based application and service focusing on intelligent machine-to-machine interaction. The M2M technology, by embedding a wireless or wired communication module and application processing logic within a machine, implements data communication without manual intervention, so as to meet informatization requirements of users on monitoring, commanding and scheduling, data collection and measurement, and the like. In an M2M system architecture, various M2M terminals (such as a sensor and a microcontroller) access an M2M service platform directly or remotely through an M2M gateway, while various M2M application servers (such as electricity meter reading and intelligent traffic) obtain, with a service capability provided by the M2M service platform, data collected by the M2M terminals, or perform remote control and management for the M2M terminals.

However, in some common M2M services, usually a same service operation needs to be performed for a large quantity of M2M terminals/gateways simultaneously, for example, simultaneously reading electricity meters in all households within an area, or simultaneously controlling power-on and power-off of all lighting and air-conditioning facilities within a building. In this case, group communication becomes especially important because it can prevent an M2M application from repetitively sending a same service operation request to various M2M terminals/gateways and save a lot of communication overheads.

The prior art provides a resource-oriented group communication method. In this method, an M2M application server, an M2M platform, an M2M terminal, an M2M gateway, and all data objects and local applications running on the M2M terminal and M2M gateway are all regarded as a RESTful (Representational State Transfer, representational state transfer) resource, and are uniquely identified by a URI (Universal Resource Identifier, universal resource identifier). By creating a group resource using the foregoing various resources as member resources, a group operation can be implemented for multiple member resources. That is, by creating a group resource, a group operation is implemented for multiple member resources, where the group resource includes information related to the member resources, for example, access paths of the member resources, names of devices having the member resources, and access addresses. For example, if meter reading resources on all target electricity meters (M2M devices) are used as member resources of a group, the M2M application server may send a read request with respect to a group resource to an entity (hereinafter referred to as a group server, which may be any one of an M2M platform, an M2M gateway, and an M2M terminal) maintaining the group resource, and the group server is responsible for forwarding the request to the target electricity meters one by one, and combining reading results into one response message returned to the M2M application server. Therefore, the M2M application server may obtain all member resources (namely, electricity meter reading content) by reading the group resource at a time. A specific communication protocol used by this method may be the HTTP (HyperText Transfer Protocol, HyperText Transfer Protocol) or the CoAP (Constrained Application Protocol, Constrained Application Protocol).

However, the existing method applied to M2M group communication saves only communication between the M2M application server and the group server, but the group server still needs to send a request to each M2M device separately. If the group server has a limited capability (for example, an M2M gateway), or a network between the group server and the M2M device has a relatively small bandwidth or a relatively high communication cost, communication between the group server and the M2M device in the method is not economical.

SUMMARY

Embodiments of the present invention provide a method, a group server, and a member device for accessing member resources, so that there is no need to unicast an access request to each member device, and that network overheads are saved.

In one aspect, the present invention provides a method for accessing member resources, including:

receiving a request for accessing member resources, where the request for accessing member resources carries a group resource identifier of a group resource to which the member resources belong; obtaining, according to the group resource identifier, a fanout universal resource identifier URI corresponding to the member resources in the group resource and a multicast address corresponding to the fanout URI, where the fanout URI is used to indicate access paths of the member resources on member devices; and sending, according to the multicast address, a member resource access request to the member devices having the member resources, where a destination URI of the member resource access request includes the fanout URI corresponding to the member resources, so that the member devices having the member resources execute, according to the access paths of the member resources on the member devices as indicated by the fanout URI, an operation indicated by the member resource access request.

Optionally, the method further includes: receiving a group resource creation request, where the group resource creation request carries each member resource, and the member resources include member devices having the member resources and access paths of the member resources on the member devices; allocating a multicast address to the member resources according to the member devices having the member resources and the access paths of the member resources on the member devices; and establishing a mapping relationship between the multicast address and the fanout URI according to the access paths of the member resources on the member devices.

Optionally, the allocating a multicast address to the member resources according to the member devices having the member resources and the access paths of the member resources on the member devices, and establishing a mapping relationship between the multicast address and the fanout URI according to the access paths of the member resources on the member devices is specifically as follows: allocating a multicast address to member resources having a same access path on the member devices, and establishing a mapping relationship between the multicast address and the fanout URI, where the fanout URI is the access path of the member resources on the member devices; and/or allocating a virtual identifier to at least one member resource having a different access path on a member device, allocating a multicast address to the at least one member resource, establishing a mapping relationship between the multicast address and the virtual identifier and a mapping relationship between the virtual identifier and the member resource, and setting the virtual identifier to the fanout URI.

Optionally, the method further includes: sending, according to the mapping relationship between the multicast address and the fanout URI, a group advertisement for joining a multicast group to the member devices having the member resources, where the group advertisement for joining the multicast group carries the multicast address, so that the member devices having the member resources join, according to the group advertisement for joining the multicast group, the multicast group corresponding to the multicast address.

Optionally, the group advertisement for joining the multicast group further carries a mapping relationship between the fanout URI and the member resources, so that the member devices having the member resources store the mapping relationship between the fanout URI and the multicast address and a mapping relationship between the member resources and the multicast address; and the executing, by the member devices having the member resources, according to the access paths of the member resources on the member devices as indicated by the fanout URI, an operation indicated by the member resource access request is specifically as follows: after receiving the access request carrying the fanout URI, determining, by the member devices having the member resources, according to the received fanout URI and the mapping relationship between the fanout URI and the member resources, the access paths of the member resources on the member devices, and executing, according to the determined access paths of the member resources on the member devices, an operation indicated by the member resource access request.

Optionally, the allocating a multicast address to the member resources according to the member devices having the member resources and the access paths of the member resources on the member devices is specifically as follows: determining, according to the member devices having the member resources, that the member devices having the member resources belong to a first group server, and allocating a multicast address of a local multicast domain to the member devices having the member resources; or determining, according to the member devices having the member resources, that not all member devices having the member resources of the group resource belong to a first group server, and allocating a multicast address of a global multicast domain to the member devices having the member resources or asking to allocate a multicast address of a remote multicast domain to member devices having the member resources but not belonging to the first group server.

Optionally, the allocating a multicast address of a global multicast domain to the member devices having the member resources is specifically as follows: requesting a multicast address of the global multicast domain from a group server having multicast addresses of the global multicast domain, and allocating the requested multicast address of the global multicast domain to the member devices having the member resources; and the asking to allocate a multicast address of a remote multicast domain to member devices having the member resources but not belonging to the first group server is specifically as follows: determining that the member devices having the member resources but not belonging to the first group server belong to a second group server, and sending a second group resource creation request to the second group server, where the second group resource creation request carries a first group resource identifier and member resources, and the member resources include member devices having the member resources and access paths of the member resources on the member devices, so that the second group server creates a second group resource according to the member devices having the member resources and the access paths of the member resources on the member devices, and allocates a multicast address to the member resources.

Optionally, the allocating a multicast address to the member resources according to the member devices having the member resources and the access paths of the member resources on the member devices is specifically as follows: determining, according to the member devices having the member resources, that the member devices having the member resources and a network to which the member devices belong support multicast, and allocating a multicast address to the member resources; and the method further includes: storing member resources corresponding to member devices not having a multicast capability, so that a group server unicasts a request for accessing member resources to the member devices not having the multicast capability.

Optionally, after the obtaining, according to the group resource identifier, the fanout URI corresponding to the member resources in the group resource and the multicast address corresponding to the fanout URI, the method further includes: setting a destination address of the request for accessing member resources to the multicast address corresponding to the fanout URI, and setting a destination URI of the request for accessing member resources to the fanout URI corresponding to the member resources to generate a member resource access request; and using the multicast address to send the member resource access request carrying the fanout URI corresponding to the member resources.

Optionally, after the obtaining, according to the group resource identifier, the fanout URI corresponding to the member resources in the group resource and the multicast address corresponding to the fanout URI, the method further includes: determining that a destination URI in the request for accessing member resources further includes a suffix; and setting a destination address of the request for accessing member resources to the multicast address corresponding to the fanout URI, setting the destination URI to the fanout URI corresponding to the member resources, and adding the suffix included in the destination URI to the fanout URI to generate a member resource access request.

Optionally, the method further includes:
receiving a group resource update request for adding member resources, where the group resource update request for adding member resources carries the group resource identifier and member resources that need to join the group resource, and the member resources that need to join the group resource include member devices having the member resources and access paths of the member resources on the member devices; and determining, according to the group resource identifier, that the access paths of the member resources that need to join the group resource on the member devices are the same as the fanout URI in the mapping relationship between the multicast address and the fanout URI in the group resource corresponding to the group resource identifier, and sending a group advertisement for joining the multicast group to the member devices having the member resources that need to join the group resource, where the group advertisement for joining the multicast group carries the multicast address in the mapping relationship between the multicast address and the fanout URI, so that the member devices having the member resources that need to join the group resource join the multicast group according to the multicast address and receive a member resource access request sent according to the multicast address; or determining, according to the group resource identifier, that the access paths of the member resources that need to join the group resource on the member devices are different from the fanout URI in the mapping relationship between the multicast address and the fanout URI in the group resource corresponding to the group resource identifier; adding the member resources that need to join the group resource to the mapping relationship between the fanout URI and the member resources in the group resource corresponding to the group resource identifier, and sending a group advertisement for joining the multicast group to the member devices having the member resources that need to join the group resource, where the group advertisement for joining the multicast group carries the mapping relationship between the multicast address and the fanout URI in the group resource corresponding to the group resource identifier and the mapping relationship between the fanout URI and the member resources in the group resource corresponding to the group resource identifier, so that upon reception of the access request carrying the fanout URI, the member devices determine, according to the received mapping relationship between the fanout URI and the member resources, the access paths of the member resources on the member devices, and execute a corresponding member resource access request according to the determined access paths of the member resources on the member devices.

Optionally, the method further includes: receiving a group resource update request for deleting member resources, where the group resource update request for deleting member resources carries member resources that need to leave the group resource and the group resource identifier, and the member resources that need to leave the group resource include member devices having the member resources and access paths of the member resources on the member devices; and determining, according to the group resource identifier, the fanout URI corresponding to the member resources that need to leave the group resource, and the mapping relationship between the multicast address and the fanout URI corresponding to the member resources that need to leave the group resource, deleting the member resources that need to leave the group resource from the mapping relationship between the multicast address and the fanout URI corresponding to the member resources that need to leave the group resource, and sending a group advertisement for leaving the multicast group to the member devices having the member resources that need to leave, where the group advertisement for leaving the multicast group carries the multicast address in the mapping relationship between the multicast address and the fanout URI corresponding to the member resources that need to leave the group resource, so that the member devices having the member resources that need to leave the multicast group indicated by the multicast address; or where, the group resource update request for deleting member resources carries member resources that need to be reserved in the group resource and the group resource identifier, where the member resources that need to be reserved in the group resource include member devices having the member resources and access paths of the member resources on the member devices;

and determining, according to the group resource identifier, the mapping relationship between the fanout URI and the member resources that need to leave the group resource, using the member resources that need to be reserved in the group resource to update the member resources in the mapping relationship between the fanout URI and the member resources that need to leave the group resource, and sending a group advertisement for leaving the multicast group to member devices having the member resources that need to leave, where the group advertisement for leaving the multicast group carries the multicast address in the mapping relationship, so that the member devices having the member resources that need to leave leave the multicast group indicated by the multicast address.

Optionally, the method further includes: determining, according to the group resource identifier in the group resource update request for deleting member resources, that the access paths of the member resources that need to leave the group resource on the member devices are different from the fanout URI corresponding to the member resources that need to leave; where the group advertisement for leaving the multicast group further includes the fanout URI corresponding to the member resources that need to leave the group resource, so that the member devices having the member resources that need to leave the group resource leave the multicast group indicated by the multicast address, and delete, according to the member resources that need to leave the group resource and the fanout URI in the group advertisement for leaving the multicast group, the member resources in multicast group information corresponding to the group resource identifier in the group resource update request for deleting member resources.

In addition, in another aspect, the present invention further provides a method for accessing member resources, including: receiving a member resource access request sent by a group server, where the member resource access request is a multicast member resource access request, and the member resource access request includes a fanout URI corresponding to a member resource, where the fanout URI is used to indicate an access path of the member resource on a member device; and determining, according to the fanout URI, the access path of the member resource on the member device, and executing an access request operation according to the access path of the member resource on the member device.

Optionally, the method further includes: receiving a group advertisement for joining a multicast group, where the group advertisement for joining the multicast group carries a multicast address, and joining, according to the group advertisement for joining the multicast group, the multicast group corresponding to the multicast address.

Optionally, the group advertisement for joining the multicast group carries a mapping relationship between the fanout URI and the member resource, and the method further includes: storing a mapping relationship between the multicast address and the fanout URI and a mapping relationship between the member resource and the multicast address.

Optionally, the method further includes: determining that a destination address of the member resource access request is a multicast address.

Optionally, the determining, according to the fanout URI, the access path of the member resource on the member device is specifically as follows:

determining multicast group information including a multicast address same as the destination address in the member resource access request, determining that the multicast group information corresponding to the multicast address same as the destination address in the member resource access request includes a fanout URI same as a destination URI in the member resource access request, and determining the access path of the member resource corresponding to the fanout URI in the multicast group information on the member device.

Optionally, the executing an access request operation according to the access path of the member resource on the member device is specifically as follows: replacing the fanout URI included in the destination URI in the member resource access request with the determined access path of the member resource on the member device, and executing an access request operation for the member resource corresponding to the determined access path of the member resource on the member device.

Optionally, the method further includes: receiving a group advertisement for leaving the multicast group, where the group advertisement for leaving the multicast group carries the multicast address; and deleting stored multicast group information corresponding to the multicast address same as the multicast address in the group advertisement for leaving the multicast group, and leaving the multicast group corresponding to the multicast address in the group advertisement for leaving the multicast group.

Optionally, the method further includes: receiving a group advertisement for leaving the multicast group, where the group advertisement for leaving the multicast group carries the multicast address corresponding to the multicast group that the member resource needs to leave and the member resource that needs to leave the group resource, and the member resource that needs to leave includes the member device having the member resource that needs to leave the group resource and the access path of the member resource on the member device; deleting the stored member resource that needs to leave the group resource in the multicast group information corresponding to the multicast address same as the multicast address in the group advertisement for leaving the multicast group; and deleting the stored multicast group information corresponding to the multicast address same as the multicast address in the group advertisement for leaving the multicast group, and leaving the multicast group corresponding to the multicast address in the group advertisement for leaving the multicast group.

Optionally, the method further includes: determining a stored member resource that does not correspond to the fanout URI in the multicast group information corresponding to the multicast address same as the multicast address in the group advertisement for leaving the multicast group.

In addition, in another aspect, the present invention further provides a group server, including: a receiving module, configured to receive a request for accessing member resources, where the request for accessing member resources carries a group resource identifier of a group resource to which the member resources belong; an obtaining module, configured to obtain, according to the group resource identifier, a fanout URI corresponding to the member resources in the group resource and a multicast address corresponding to the fanout URI, where the fanout URI is used to indicate access paths of the member resources on member devices; and a sending module, configured to send, according to the multicast address, a member resource access request to the member devices having the member resources, where a destination URI of the member resource access request includes the fanout URI corresponding to the member resources, so that the member devices having the member resources execute, according to the access paths of the member resources on the member devices as indicated by the fanout URI, an operation indicated by the member resource access request.

Optionally, the receiving module is further configured to receive a group resource creation request, where the group resource creation request carries each member resource, and the member resources include member devices having the member resources and access paths of the member resources on the member devices; and the group server further includes a processing module, configured to allocate a multicast address to the member resources according to the member devices having the member resources and the access paths of the member resources on the member devices, and establish a mapping relationship between the multicast address and the fanout URI according to the access paths of the member resources on the member devices.

Optionally, the processing module is specifically configured to allocate a multicast address to member resources having a same access path on the member devices, and establish a mapping relationship between the multicast address and the fanout URI, where the fanout URI is the access path of the member resources on the member devices; and/or configured to allocate a virtual identifier to at least one member resource having a different access path on a member device, allocate a multicast address to the at least one member resource, and establish a mapping relationship between the multicast address and the virtual identifier and a mapping relationship between the virtual identifier and the member resource, and set the virtual identifier to the fanout URI.

Optionally, the sending module is further configured to send, according to the mapping relationship between the multicast address and the fanout URI, a group advertisement for joining a multicast group to the member devices having the member resources, where the group advertisement for joining the multicast group carries the multicast address, so that the member devices having the member resources join, according to the group advertisement for joining the multicast group, the multicast group corresponding to the multicast address.

Optionally, the allocating, by the processing module, a multicast address to the member resources according to the member devices having the member resources and the access paths of the member resources on the member devices is specifically as follows: determining, according to the member devices having the member resources, that the member devices having the member resources belong to a first group server, and allocating a multicast address of a local multicast domain to the member devices having the member resources; or determining, according to the member devices having the member resources, that not all member devices having the member resources of the group resource belong to a first group server, and allocating a multicast address of a global multicast domain to the member devices having the member resources or asking to allocate a multicast address of a remote multicast domain to member devices having the member resources but not belonging to the first group server.

Optionally, the allocating, by the processing module, a multicast address of a global multicast domain to the member devices having the member resources is specifically as follows: requesting a multicast address of the global multicast domain from a group server having multicast addresses of the global multicast domain, and allocating the requested multicast address of the global multicast domain to the member devices having the member resources; and the asking to allocate a multicast address of a remote multicast domain to member devices having the member resources but not belonging to the first group server is specifically as follows: determining that the member devices having the member resources but not belonging to the first group server belong to a second group server, and sending a second group resource creation request to the second group server, where the second group resource creation request carries a first group resource identifier and member resources, and the member resources include member devices having the member resources and access paths of the member resources on the member devices, so that the second group server creates a second group resource according to the member devices having the member resources and the access paths of the member resources on the member devices, and allocates a multicast address to the member resources.

Optionally, the allocating, by the processing module, a multicast address to the member resources according to the member devices having the member resources is specifically as follows: determining, according to the member devices having the member resources, that the member devices having the member resources and a network to which the member devices belong support multicast, and allocating a multicast address to the member resources; and the processing module is further configured to store member resources corresponding to member devices not having a multicast capability, so that a group server unicasts a request for accessing member resources to the member devices not having the multicast capability.

Optionally, the processing module is further configured to: set a destination address of the request for accessing member resources to the multicast address corresponding to the fanout URI, and set a destination URI of the request for accessing member resources to the fanout URI corresponding to the member resources to generate a member resource access request; and further configured to use the multicast address to send the member resource access request carrying the fanout URI corresponding to the member resources.

Optionally, the processing module is further configured to determine that a destination URI in the request for accessing member resources further includes a suffix; and set a destination address of the request for accessing member resources to the multicast address corresponding to the fanout URI, set the destination URI in the request for accessing member resources to the fanout URI corresponding to the member resources, and add the suffix included in the destination URI to the fanout URI to generate a member resource access request.

optionally the receiving module is further configured to receive a group resource update request for adding member resources, where the group resource update request for adding member resources carries the group resource identifier and member resources that need to join the group resource, and the member resources that need to join the group resource include member devices having the member resources and access paths of the member resources on the member devices; and the processing module is further configured to determine, according to the group resource identifier, that the access paths of the member resources that need to join the group resource on the member devices are the same as the fanout URI in the mapping relationship between the multicast address and the fanout URI in the group resource corresponding to the group resource identifier, and send a group advertisement for joining the multicast group to the member devices having the member resources that need to join the group resource, where the group advertisement for joining the multicast group carries the multicast address in the mapping relationship between the multicast address and the fanout URI, so that the member devices having the member resources that need to join the group resource join the multicast group according to the multicast address and receive a member resource access request sent according to the multicast address; or the processing module is further configured to determine, according to the group resource identifier, that the access paths of the member resources that need to join the group resource on the member devices are different from the fanout URI in the mapping relationship between the multicast address and the fanout URI in the group resource corresponding to the group resource identifier; add the member resources that need to join the group resource to the mapping relationship between the fanout URI and the member resources in the group resource corresponding to the group resource identifier, and send a group advertisement for joining the multicast group to the member devices having the member resources that need to join the group resource, where the group advertisement for joining the multicast group carries the mapping relationship between the multicast address and the fanout URI in the group resource corresponding to the group resource identifier and the mapping relationship between the fanout URI and the member resource, so that upon reception of the access request carrying the fanout URI, the member devices determine, according to the received mapping relationship between the fanout URI and the member resources, the access paths of the member resources on the member devices, and execute a corresponding member resource access request according to the determined access paths of the member resources on the member devices.

Optionally, the receiving module is further configured to receive a group resource update request for deleting member resources, where the group resource update request for deleting member resources carries member resources that need to leave the group resource and the group resource identifier, and the member resources that need to leave the group resource include member devices having the member resources and access paths of the member resources on the member devices; and the processing module is further configured to determine, according to the group resource identifier, the fanout URI corresponding to the member resources that need to leave the group resource, and the mapping relationship between the multicast address and the fanout URI corresponding to the member resources that need to leave the group resource, delete the member resources that need to leave the group resource from the mapping relationship, and send a group advertisement for leaving the multicast group to the member devices having the member resources that need to leave, where the group advertisement for leaving the multicast group carries the multicast address in the mapping relationship between the multicast address and the fanout URI corresponding to the member resources that need to leave the group resource, so that the member devices having the member resources that need to leave leave the multicast group indicated by the multicast address; or the receiving module is further configured to receive a group resource update request for deleting member resources, where the group resource update request for deleting member resources carries member resources that need to be reserved in the group resource and the group resource identifier, and the member resources that need to be reserved in the group resource include member devices having the member resources and access paths of the member resources on the member devices; and the processing module is further configured to determine, according to the group resource identifier, the mapping relationship between the fanout URI and the member resources that need to leave the group resource, use the member resources that need to be reserved in the group resource to update the member resources in the mapping relationship between the fanout URI and the member resources that need to leave the group resource, and send a group advertisement for leaving the multicast group to member devices having the member resources that need to leave, where the group advertisement for leaving the multicast group carries the multicast address in the mapping relationship, so that the member devices having the member resources that need to leave the multicast group indicated by the multicast address.

Optionally, the processing module is further configured to determine, according to the group resource identifier in the group resource update request for deleting member resources, that the access paths of the member resources that need to leave the group resource on the member devices are different from the fanout URI corresponding to the member resources that need to leave; where the group advertisement for leaving the multicast group further includes the fanout URI corresponding to the member resources that need to leave the group resource, so that the member devices having the member resources that need to leave the group resource leave the multicast group indicated by the multicast address, and delete, according to the member resources that need to leave the group resource and the fanout URI in the group advertisement for leaving the multicast group, the member resources in multicast group information corresponding to the group resource identifier in the group resource update request for deleting member resources.

In addition, in another aspect, the present invention further provides a member device, including: a receiving module, configured to receive a member resource access request sent by a group server, where the member resource access request is a multicast member resource access request, the member resource access request includes a fanout URI corresponding to the member resource, and the fanout URI is used to indicate an access path of the member resource on the member device; and an operating module, configured to determine, according to the fanout URI, the access path of the member resource on the member device, and execute an access request operation according to the access path of the member resource on the member device.

Optionally, the receiving module of the member device is further configured to: receive a group advertisement for joining a multicast group, where the group advertisement for joining the multicast group carries a multicast address; and join, according to the group advertisement for joining the multicast group, the multicast group corresponding to the multicast address.

Optionally, the group advertisement for joining the multicast group further carries a mapping relationship between the fanout URI and the member resource, and the member device further includes: a storing module, configured to store a mapping relationship between the fanout URI and the multicast address and a mapping relationship between the member resource and the multicast address.

Optionally, the member device further includes: a determining module, configured to determine that a destination address of the member resource access request is a multicast address.

Optionally, the determining, by the operating module of the member device according to the fanout URI, the access path of the member resource on the member device is specifically as follows: determining multicast group information including a multicast address same as the destination address in the member resource access request, determining that the multicast group information corresponding to the multicast address same as the destination address in the member resource access request includes a fanout URI same as a destination URI in the member resource access request, and determining the access path of the member resource corresponding to the fanout URI in the multicast group information on the member device.

Optionally, the executing, by the operating module of the member device, an access request operation according to the access path of the member resource on the member device is specifically as follows: replacing the fanout URI included in the destination URI in the member resource access request with the determined access path of the member resource on the member device, and executing an access request operation for the member resource corresponding to the determined access path of the member resource on the member device.

Optionally, the receiving module of the member device is further configured to receive a group advertisement for leaving the multicast group, where the group advertisement for leaving the multicast group carries the multicast address; and the storing module of the member device is further configured to delete stored multicast group information corresponding to the multicast address same as the multicast address in the group advertisement for leaving the multicast group, and leave the multicast group corresponding to the multicast address in the group advertisement for leaving the multicast group.

Optionally, the receiving module of the member device is further configured to receive a group advertisement for leaving the multicast group, where the group advertisement for leaving the multicast group carries the multicast address and the member resource that needs to leave, and the member resource that needs to leave includes the member device having the member resource that needs to leave the group resource and the access path of the member resource on the member device; and the storing module of the member device is further configured to delete the stored member resource that needs to leave the group resource in the multicast group information corresponding to the multicast address same as the multicast address in the group advertisement for leaving the multicast group; and delete the stored multicast group information corresponding to the multicast address same as the multicast address in the group advertisement for leaving the multicast group, and leave the multicast group corresponding to the multicast address in the group advertisement for leaving the multicast group.

Optionally, the storing module of the member device is further configured to determine a stored member resource that does not correspond to the fanout URI in the multicast group information corresponding to the multicast address same as the multicast address in the group advertisement for leaving the multicast group.

As may be seen from the technical solutions provided in the embodiments of the present invention, according to an established mapping relationship between a multicast address and a fanout URI in a group resource, a member resource access request may be sent by multicast to member devices having member resources in the group resource, and the fanout URI is included in the member resource access request, so that the member devices having the member resources execute, according to access paths of the member resources on the member devices as indicated by the fanout URI, an operation indicated by the member resource access request. Therefore, the group server does not need to unicast the access request to each member device, and network overheads are saved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2-A is a flowchart of creating a multicast group according to an embodiment of the present invention;

FIG. 2-B is a schematic diagram of an architecture showing M2M network connection relationships according to an embodiment of the present invention;

FIG. 2-C is a flowchart of allocating a multicast address to member devices and establishing a mapping relationship according to an embodiment of the present invention;

FIG. 2-D is a schematic diagram of an architecture showing M2M network connection relationships according to an embodiment of the present invention;

FIG. 2-E is a schematic diagram of an architecture showing M2M network connection relationships according to an embodiment of the present invention;

FIG. 2-F is a schematic diagram of RESTful resources included in group resource representations according to an embodiment of the present invention;

FIG. 2-G is a schematic diagram of multicast group resources stored by member devices according to an embodiment of the present invention;

FIG. 3-A is a flowchart of a method for processing a received member resource access request by a member device according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
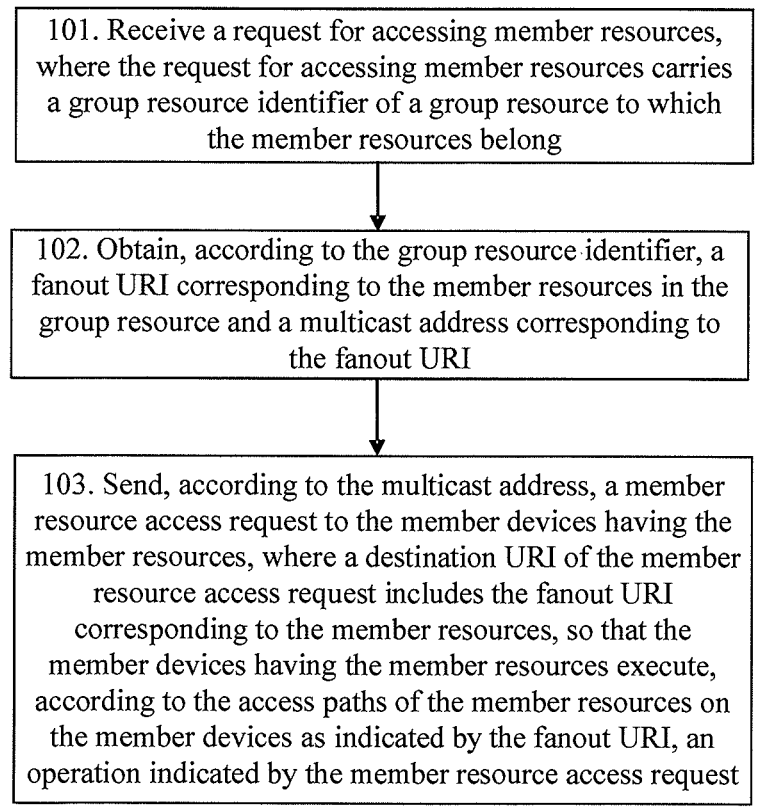
FIG. 1 is a flowchart of a method for accessing member resources according to an embodiment of the present invention.

As shown in FIG. 1, a method for accessing member resources according to an embodiment of the present invention includes the following steps:

Step 101: Receive a request for accessing member resources, where the request for accessing member resources carries a group resource identifier of a group resource to which the member resources belong.

Specifically, a first group server receives a request for accessing member resources. For example, the first group server receives a request for accessing member resources whose group resource identifier is Grp4: GET http://g1.example.org/groups/grp4/membersContent/data HTTP/1.1. Grp4 is a group resource identifier, the "membersContent" part indicates that the request is an operation for all member resources in a group resource corresponding to Grp4, and "data" is an instance of a suffix, and used to indicate that the request specifically should access "data" data of each member resource.

Step 102: Obtain, according to the group resource identifier, a fanout URI corresponding to the member resources in the group resource and a multicast address corresponding to the fanout URI, where the fanout URI is used to indicate access paths of the member resources on member devices.

Specifically, when the first group server receives the request for accessing member resources, the first group server first checks, according to the group resource identifier in the request for accessing member resources, whether a mapping relationship between the multicast address and the fanout URI is established for the group resource and whether a mapping relationship between the fanout URI and the member resources is further established. If the mapping relationship between the multicast address and the fanout URI is established, the first group server sends a member resource access request to each member device according to the mapping relationship between the multicast address and the fanout URI; otherwise, the first group server sends a request for accessing member resources in a unicast mode one by one according to a method of the prior art.

In a case where the mapping relationship between the multicast address and the fanout URI is established, when the first group server sends a member resource access request to each member device according to the mapping relationship, a destination address of the request for accessing member resources should be set to the multicast address in the mapping relationship between the multicast address and the fanout URI (namely, the multicast address allocated by the group server to the member resources), and a destination URI should be set to the fanout URI. When the group resource includes multiple groups of mapping relationships between multicast addresses and fanout URIs, a member resource access request should be sent with respect to each group of mapping relationships between multicast addresses and fanout URIs according to the foregoing method. If the destination URI in the request for accessing member resources, which is received by the first group server, further includes any suffix (internal information such as a child resource, an attribute, and a parameter used to access the member resources), the corresponding suffix should also be added to the fanout URI according to the destination URI in the member resource access request sent by the first group server. Specifically, the first group server needs to determine that the destination URI in the request for accessing member resources further includes a suffix. Therefore, the first group server further needs to set the destination URI to the fanout URI corresponding to the member resources, and add the suffix included in the destination URI to the fanout URI to generate a member resource access request.

Specifically, the mapping relationship between the multicast address and the fanout URI and the mapping relationship between the fanout URI and the member resources, stored by the first group server or other group servers for each group resource, are as shown in Table 1.

TABLE 1

Group resource mapping table

| Group Resource | Member Resource | Multicast Address | Fanout URI |
| --- | --- | --- | --- |
| Grp4 | m41, m42 | [FF32:30:3FFE:FFFF:1::1231] | /x/temp1 |

Grp4 is a group resource identifier; m41 and m42 are member resources; the multicast address [FF32:30:3FFE:FFFF:1::1231] is a multicast address allocated to the member resources m41 and m42 in the group resource Grp4; the fanout URI /xxx/temp1 is an access path of the member resources m41 and m42 on member devices having the member resources. Generally, as shown in Table 1, at least two member resources correspond to one multicast address and one fanout URI.

In the embodiment described in Table 1, if the group resource Grp4 is used as another example and includes only the member resources m41 and m42 according to the mapping relationships in Table 1 in the embodiment, the member resource column in Table 1 may also not include m41 and m42. In this case, only the mapping relationship between the fanout URI and the multicast address is included in Table 1.

Step 103: Send, according to the multicast address, a member resource access request to the member devices having the member resources, where a destination URI of the member resource access request includes the fanout URI corresponding to the member resources, so that the member devices having the member resources execute, according to the access paths of the member resources on the member devices as indicated by the fanout URI, an operation indicated by the member resource access request.

Specifically, the first group server sends the following member resource access request to the member devices according to the mapping relationship between the fanout URI and the multicast address as shown in Table 1:
GET /xxx/temp1/data HTTP/1.1
Host: [FF32:30:3FFE:FFFF:1::1231]

The URI carried in the GET command is the fanout URI "/xxx/temp1/data" after a suffix "data" is added, and the Host header field is used as the destination address to carry the multicast address (namely, an IPv6 multicast address allocated by the first group server to the member resources m41 and m42 in the group resource Grp4).

Therefore, after receiving the GET /xxx/temp1/data HTTP/1.1 request according to the multicast address [FF32:30:3FFE:FFFF:1::1231], the member devices having the member resources m41 and m42 (assumed to be D1 and D2) may send the data with the suffix "data" in the /xxx/temp1 path on the member devices D1 and D2 to the first group server. Therefore, the first group server does not need to send a member resource access request to the member devices D1 and D2 in a unicast mode, and network traffic is saved.

In addition, before the first group server receives the request for accessing member resources, the first group server further receives a group resource creation request, where the group resource creation request carries each member resource, and the member resources include member devices having the member resources and access paths of the member resources on the member devices; and allocates, according to the member devices having the member resources and the access paths of the member resources on the member devices, at least one multicast address to the member devices having the member resources, and establishes a mapping relationship between the multicast address and the fanout URI according to the access paths of the member resources on the member devices, where the fanout URI is used to indicate the access paths of the member resources on the member devices. Specifically, for creating, by the first group server, a group resource, and establishing a mapping relationship between a multicast address and the fanout URI, reference may be made to the description of FIG. 2. The following steps are included:

Step 201: The first group server receives a group resource creation request, where the group resource creation request carries each member resource, and the member resources include member devices having the member resources and access paths of the member resources on the member devices.

Step 202: The first group server obtains characteristics of the member resources according to the member devices having the member resources and the access paths of the member resources on the member devices, and determines, according to the characteristics of the member resources, whether it is necessary to create a multicast group. Specifically, for the determining, by the first group server, whether it is necessary to create a multicast group, reference may be made to the description of FIG. 2-A. The following steps are included:

Step 202-1: The first group server parses the group resource creation request to obtain descriptions of characteristics of the group resource and descriptions of characteristics of the member resources thereof, including but not limited to characteristics such as a type attribute of the group resource (being a static, dynamic, or temporary group or not), a purpose of the group resource (requiring a reliable response for a request or not), the access paths of the member resources on the member devices, access interfaces of the member resources, the member devices having the member resources, and network features thereof (supporting multicast or not).

For example, the descriptions of characteristics of the group resource may be obtained from description content of the group resource carried in the group resource creation request. The description content of the group resource includes the type attribute and purpose of the group resource. The descriptions of characteristics of the member resources may be obtained according to the URI information of the member resources included in the group resource description, and include URI structures of the member resources, access interfaces of the member resources, and the like. The member devices having the member resources may be also accessed according to the URIs of the member resources, so that characteristics such as the member devices having the member resources and network features of the member devices are further obtained.

Step 202-2: Determine, according to the group description of the group resource creation request, whether the group resource to be created is a relatively static group or a dynamic group that changes frequently; if the group resource to be created is a relatively static group, perform a subsequent determination process; if the group resource to be created is a dynamic group, end the process without creating a multicast group for the group resource, thereby avoiding overheads of multicast group creation and maintenance caused by frequent group changes. The relatively static group may be: a group whose group description includes a specific member resource list and whose member changes are controlled by the first group server according to a group management command (for example, adding/deleting a member). The dynamic group includes but is not limited to: a group including member resources that are a resource set meeting particular conditions, for example, member resources in a specific geographical range or member resources having other same characteristics, where changes of group members may be triggered automatically according to changes of the characteristics of the member resources (for example, a member leaves or enters a geographical range or the group selects a channel).

Step 202-3: Determine, according to the access interfaces of the member resources carried in the group resource creation request, whether the access interfaces of the member resources are consistent, and if the access interfaces of the number resources are consistent, perform a subsequent determination process, or otherwise, end the process without creating a multicast group for the group resource. Whether the access interfaces of the member resources are consistent is specifically whether a same multicast data packet (for example, an IPv4 or IPv6 data packet) can be used for access. For example, if URIs for accessing multiple member resources comply with a same protocol and access port number, and access paths in the URIs of the multiple member resources are the same on different member devices, it may be considered that the multiple member resources have a same resource access interface. In an actual system, the URI may be represented by a URL (Uniform Resource Locator, uniform resource locator), while a basic structure of the URL includes:

<scheme>://<authority>:<port>/
<path>?<query>#<fragment>

The <scheme> part determines a protocol used for accessing a resource corresponding to the URL (for example, HTTP or CoAP); the <authority> part determines an address of a member device having the member resource (for example, an IP address or a domain name); <port> is an optional item, indicating a protocol access port number; and <path>?<query>#<fragment> indicates an access path of the resource on the member device.

For example, assuming that domain names of an M2M platform N1, an M2M device D1, and an M2M gateway G1 are respectively n1.example.com, d1.example.com, and g1.example.com, a URL of a group resource Grp1 on N1 is:

Grp1=http://n1.example.com/groups/grp1

URLs of member resources m11, m12, m13, and m14 included therein are respectively as follows:

m11=coap://d1.example.com/xxx/temp1
m12=coap://d1.example.com/yyy/temp2
m13=coap://g1.example.com/xxx/temp1
m14=http://n1.example.com/xxx/temp1

Among the 4 member resources, m11 and m13 have a same resource access interface, because the same CoAP is used in the <scheme> thereof and both access paths thereof on member devices (d1 and g1 herein) are /xxx/temp1; conversely, m12 and m14 have different resource access interfaces from other member resources, because the access path of m12 on the member device d1 is /yyy/temp2, while the <scheme> of m14 is the HTTP. In this example, a multicast group may be created for m11 and m13, but m12 and m14 are not included.

Step 202-4: The first group server determines whether the member resources, the member devices having the member resources, and a network to which the member devices belong support multicast, and if multicast is supported, perform a subsequent determination process, or otherwise, end the process without creating a multicast group for the group resource. Whether the member resources support multicast may be determined according to whether the URLs corresponding to the member resources support multicast protocol access (for example, not supported by the HTTP, but supported by the CoAP). The first group server may further need to obtain related resource representation information, such as registration information, of the member resources and the member devices having the member resources, and determine, according to the resource representation information such as registration information, whether the member devices having the member resources and the network to which the member devices belong support multicast.

For example, on the M2M platform N1, registration information of the member device D1 having the member resource m11 may be accessed according to the following URL: http://n1.example.com/sc1s/d1.

The first group server may send an HTTP GET request to N1 to obtain resource representation content corresponding to the URL. In the resource representation content, whether D1 supports multicast may be indicated by a special attribute (for example, "multicastEnabled"). If the value of the attribute is TRUE, it indicates that multicast is supported. If the value is FALSE, it indicates that multicast is not supported.

Figure 2:
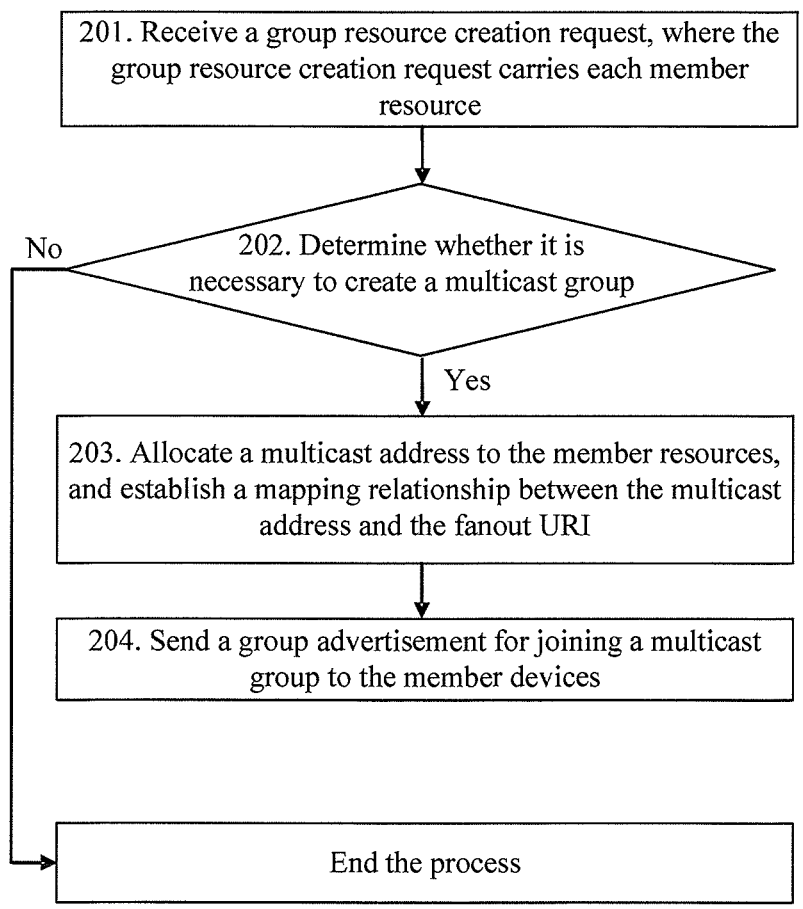
FIG. 2 is a flowchart of a method for creating a group resource according to an embodiment of the present invention.

Optionally, even if the member device having the member resource does not support multicast, when the member resource needs to be accessed through another device supporting multicast, it may also be determined that the member device having the member resource supports multicast. As shown in FIG. 2-B, the first group server is an M2M device D1, and a group resource Grp2 includes a member resource m21 on an M2M platform, but D1 accesses m21 through an M2M gateway G1.

If a communication link between D1 and G1 supports multicast (for example, the CoAP), D1 may send a request to G1 in multicast mode, and then G1 converts the request into unicast mode (for example, the HTTP) to access m21 on N1. In this case, it may be considered that multicast is supported for accessing the member resource m21.

Step 202-5: The first group server determines whether a quantity of member devices having the member resources meeting the foregoing conditions reaches a particular quantity, and if the quantity of member devices having the member resources meeting the foregoing conditions reaches the particular quantity, performs a subsequent step, or otherwise, ends the process without creating a multicast group for the group resource. Herein, a quantity determined according to a preconfigured policy or parameter may be used as a threshold for creating a multicast group. When the threshold is not reached, it is unnecessary to create a multicast group for the foregoing member resources, so that a management overhead of the multicast group is saved.

It should be noted that the time sequence of steps 202-2 to 202-5 is not strictly limited, and that the first group server may perform only one or more steps from 202-2 to 202-5 according to a configured policy or capability, which is not limited herein by the embodiment of the present invention. In addition, the first group server may further determine whether the request for accessing member resources of the group resource requires a reliable response, and if member access for the group resource requires a reliable response, ends the process without creating a multicast group for the group resource, or otherwise, performs a subsequent determination process.

Requiring a reliable response means that a response message indicating operation success or failure must be returned after the member devices having the member resources receive a member resource access request. Specifically, a request message of a Confirmable (CON) type in the CoAP is a member resource access request requiring a reliable response, and a receiver of the member resource access request must return a response message of an Acknowledgement (ACK) or Reset (RST) type; a request message of a Non-Confirmable (NON) type does not require a message receiver to return any response message.

Step 203: Allocate a multicast address to the member resources according to the member devices having the member resources and the access paths of the member resources on the member devices, and establish a mapping relationship between the multicast address and the fanout URI according to the access paths of the member resources on the member devices. Specifically, reference may be made to the description of FIG. 2-C. The following steps are included:

Step 203-1: The first group server analyzes a condition of multicast domains to which the member devices having the member resources meeting various conditions in step 202 belong and whether all the member devices belong to a local multicast domain; and if all the member devices belong to a local multicast domain, executes step 203-4, or otherwise, executes step 203-2.

Specifically, in the embodiment of the present invention, multicast domains may be classified into a local multicast domain, a remote multicast domain, and a global multicast domain. The local multicast domain is an area of network addresses managed by the first group server. The first group server is capable of allocating multicast addresses of the local multicast domain (local multicast addresses) to member devices in the area. After devices in the area join a multicast group indicated by a local multicast address, data packets destined for the local multicast address may be received by all member devices that have joined the local multicast group. The remote multicast domain is an area other than the area of network addresses managed by the first group server. The group server is incapable of allocating a local multicast address to the remote multicast domain, and member devices in the local multicast domain cannot receive data packets destined for a multicast address of the remote multicast domain (remote multicast address) (even if the local multicast address and the remote multicast address are the same, because a same address space may be used repeatedly by different multicast domains), and vice versa. The global multicast domain refers to an entire network area including the local multicast domain and the remote multicast domain. Therefore, local network devices and remote network devices may receive data packets destined for a global multicast address so long as they join a multicast group indicated by a multicast address in a global multicast domain (global multicast address). Global multicast addresses may be managed and allocated in a unified manner by a global network entity, and may also be allocated in advance to some group servers according to particular address planning. For a guide to an allocation scheme of IPv4 and IPv6 multicast address spaces, reference may be made to standard documents such as [RFC 3171] and [RFC 4291]. Which multicast domain a member device specifically belongs to may be determined according to a connection relationship between the member device and the group server. For example, if a member device (for example, an M2M device) registers with the first group server (for example, an M2M gateway), it may be considered that the member device belongs to the local multicast domain of the group server. If a member device registers with another entity at a same level as the first group server (for example, another M2M gateway) or a higher level than the first group server (for example, an M2M platform) (that is, the member device belongs to the second group server), it may be considered that the member device belongs to the remote multicast domain. That is, the first group server obtains registration information of each member device according to the member addresses in the group resource creation request, and then determines, according to the registration information, whether the member device belongs to the local multicast domain.

203-2. The first group server determines whether a global multicast address can be allocated to the member devices of the group resource, and if a global multicast address can be allocated to the member devices of the group resource, executes step 203-5, or otherwise, executes step 203-3.

Specifically, as described in step 203-1, global multicast addresses may be allocated in advance to some group servers according to an address planning policy. Therefore, when the first group server determines that not all the member devices of the group resource belong to the local multicast domain managed by the first group server, the first group server searches itself to see whether any unallocated global multicast address exists in the global multicast address space that is allocated in advance, or the first group server sends an address allocation request to a global entity that is responsible for managing global multicast address allocation. A specific implementation manner of sending, by the first group server, an address allocation request to a global multicast address management entity that is responsible for managing global multicast addresses is as follows:

Assuming that the global multicast address management entity is an M2M platform N1, and that a resource URL for allocating a global multicast address on N1 is http://n1.example.com/mcAddrPool, the first group server may access a resource http://n1.example.com/mcAddrPool according to an HTTP GET request. If N1 returns a success response, a global multicast address requested by the first group server may be obtained from a message body of the response message. If N1 returns a failure response, it means that the M2M platform N1 cannot allocate a global multicast address to the member devices.

Actually, the first group server may also use a similar method to request a remote or global multicast address to be allocated by another entity (for example, another group server) that is responsible for managing allocation of local or remote multicast addresses. The implementation manner is similar to the manner of requesting a global multicast address from the M2M platform N1, and is not described in detail in the present invention.

203-3. The first group server determines whether member devices not belonging to the local multicast domain (non-local member devices) can be accessed through the second group server, and if member devices not belonging to the local multicast domain can be accessed through the second group server, executes step 203-6, or otherwise, executes step 203-7. For example, it is assumed that the first group server is a first M2M gateway G1, and that a group resource Grp3 includes the following non-local member resources m31, m32, m33, and m34:

m31=http://d2.example.com/xxx/temp1
m32=http://d2.example.com/xxx/temp2
m33=coap://d3.example.com/xxx/temp1
m34=coap://d4.example.com/xxx/temp1

Then, the member device having m31 and m32 is an M2M device D2, while member devices having m33 and m34 are respectively M2M devices D3 and D4, and none of D2, D3, and D4 belongs to a local multicast domain of G1. It is assumed that D3 and D4 can be accessed through a second M2M gateway G2, and that their connection relationship is shown in FIG. 2-D. Therefore, it may be considered that the members resources (m31, m32) can be accessed through the second group server (M2M device D2 in FIG. 2-D), while member resources (m33, m34) can be accessed through a third group server (M2M gateway G2 in FIG. 2-D). However, if D2 or G2 is unable to act as a group server due to reasons such as device capabilities, it may be considered that member resources (m31, m32) or (m33, m34) cannot be accessed through another group server, specifically, the first group server in the embodiment of the present invention (M2M gateway G1 in FIG. 2-D).

It should be noted that even if only one member resource (for example, only m31 exists, and m32 does not exist) can be accessed through another group server, step 203-6 may still be performed to create a group resource for the member resource m31. From a perspective of improving efficiency, the first group server may determine a member quantity threshold according to a preconfigured policy or parameter. When the threshold is not reached, it is considered that the foregoing determination conditions are not met. Therefore, step 203-7 other than step 203-6 is performed to save a group management overhead.

203-4. The first group server allocates a local multicast address to local member devices that support multicast.

203-5. The first group server allocates a global multicast address to all member devices that support multicast.

203-6. The first group server requests, according to a determination result in step 203-3, the second group server to create a second group resource on the second group server, where the second group resource includes member resources that are not managed by the first group server and can be accessed through the second group server. Afterward, the second group server starts to execute a related process from step 201 in FIG. 2 according to the method disclosed by the present invention, which is not further described herein in the embodiment of the present invention.

203-7. The first group server records a list of non-local member resources that cannot be accessed through the second group server, so as to access those member resources in a unicast mode later.

203-8. Determine whether the second group server (for example, G2 in FIG. 2-D) is a local multicast domain device (that is, whether access is performed through the first group server), and if the second group server is a local multicast domain device, perform step 203-9. The first group server may further allocate a local multicast address to the second group server and perform step 203-10. Otherwise, establish a mapping relationship between the member resources and the second group server, and access the second group server in a default unicast mode. In the example shown in FIG. 2-D, the second group server D2 or G2 is not a local multicast device of the first group server G1.

Step 203-10: Establish a mapping relationship for the group resource in the first group server according to a multicast address allocation result in step 203-4, 203-5, or 203-9, or an access address of the second group server in 203-8, or addresses of member devices in 203-7.

Specifically, member resources in the same multicast domain may share one multicast address; however, various types of mapping relationships may be established for the group resource according to whether access interfaces of the member resources are consistent. Specifically, no matter whether the access interfaces of the member resources are the same, it is necessary to associate the group resource identifier with the allocated multicast address and establish a mapping relationship between the multicast address and the "fanout URI". The fanout URI is the destination URI of the member resource access request sent to the member devices by the first group server when receiving the request for accessing the member resources of the group resource. Specifically, when the URIs of the member resources comply with the same protocol and access port number, and the access paths of the member resources on the member devices are the same, the fanout URI is the access path of the member resources on the member devices. When the URIs comply with the same protocol and access port number, but the access paths on the member devices are different, the fanout URI is set to a virtual resource identifier (which may be a group resource identifier or a resource identifier in another form). For establishing the mapping relationship between the multicast address and the fanout URI, reference may be made to the following cases:

First case: The access paths of the member resources of the group resource on the member devices are the same.

For example, it is assumed that a group resource Grp4 on the M2M gateway G1 is Grp4=http://g1.example.org/groups/grp4.

Member resources included therein are m41 on an M2M device D1 and m42 on an M2M device D5:

m41=coap://d1.example.org/xxx/temp1
m42=coap://d5.example.org/xxx/temp1

An IPv6 multicast address allocated by the first group server (M2M gateway G1 in this example) to the member resources m41 and m42 in the group resource Grp4 is [FF32:30:3FFE:FFFF:1::1231], and the network connection relationship between devices is shown in FIG. 2-E (that is, both member devices D1 and D2 having the member resources m41 and m42 belong to the M2M gateway G1). The mapping relationship between the fanout URI (/xxx/temp1) and the multicast address ([FF32:30:3FFE:FFFF:1::1231]) of the group resource Grp4 and the mapping relationship between the fanout URI (/xxx/temp1) and the member resources (m41 and m42) of the group resource Grp4 are as shown in Table 1. Certainly, in this case, because the access paths of all the member devices having the group resource on the member devices are the same, all the member resources correspond to one multicast address and one fanout URI. Therefore, the mapping relationship may further be only a mapping relationship between the fanout URI and the multicast address of the group resource Grp4, and it is unnecessary to record the mapping relationship between the fanout URI and the member resources of the group resource. However, the same group server generally includes multiple group resources, while member resource features of each group resource are inconsistent. Therefore, for record consistency, even if it is unnecessary to record the mapping relationship between the fanout URI and the member resources, the member resources may be recorded in the mapping relationship in the list or related attributes may be reserved, so that record consistency is ensured.

Second case: The member resources of the group resource represent the member devices having the member resources.

For example, it is assumed that a group resource Grp5 on the M2M gateway G1 is Grp5=http://g1.example.org/groups/grp5, where member resources included are m51, m52, and m53 on M2M devices D1, D5, and D6 respectively.

m51=coap://d1.example.org/
m52=coap://d5.example.org/
m53=coap://d6.example.org/

An allocated IPv6 multicast address is [FF32:30:3FFE:FFFF:1::1232], and the network connection relationship between devices is still as shown in FIG. 2-E (that is, all the member devices D1, D5, and D6 respectively having the member resources m51, m52, and m53 belong to the M2M gateway G1). Therefore, the fanout URI corresponding to the member resources m51, m52, and m53 is a root symbol "/", and the mapping relationship between the fanout URI (/) and the multicast address ([FF32:30:3FFE:FFFF:1::1232]) of the group resource Grp5 and the mapping relationship between the fanout URI (/) and the member resources (m51, m52, and m53) are as shown in Table 2. In this case, fanout URI information may also be omitted for simplicity. In addition, in this case, the mapping relationship may also be referred to as the mapping relationship between the multicast address ([FF32:30:3FFE:FFFF:1::1232]), the fanout URI (/), and the member resources (m51, m52, and m53) of the group resource. Unless otherwise specially noted in the embodiment of the present invention, the mapping relationship refers to the mapping relationship between the multicast address, the member resources, and the fanout URI.

Third case: The access paths of the member resources of the group resource on respective member devices are different.

For example, it is assumed that a group resource Grp6 on the M2M gateway G1 is Grp6=http://g1example.org/groups/grp6, where member resources of the group resource Grp6 are m61 on an M2M device D5 and (m62, m63) on an M2M device D6 respectively:

m61=coap://d5.example.org/xx
m62=coap://d6.example.org/yy
m63=coap://d6.example.org/zz An IPv6 multicast address allocated by the first group server (M2M gateway G1 in FIG. 2-E in this example) to Grp6 is [FF32:30:3FFE:FFFF:1::1233], and the network connection relationship between devices is shown in FIG. 2-E (both the member device D5 and the member device D6 having the member resources m62 and m63 belong to the M2M gateway G1. Therefore, the first group server needs to allocate a virtual fanout URI to each member resource of the group resource Grp6 (the specific allocation method may be determined by the first group server, and is not limited herein in the embodiment of the present invention), for example, "/well-know/grp6". The virtual fanout URI (/well-know/grp6) does not directly correspond to member resources on any member device, but each member device needs to associate the virtual fanout URI with the member resource corresponding to the virtual fanout URI and belonging to the member device in the group resource. For the specific association method, reference may be made to the subsequent related description of FIG. 2-G. In addition, to avoid a name conflict of the virtual fanout URIs allocated by different group servers, which may occur on the same member device, proper name space division may be adopted between different group servers, or a unique group URI (for example, /g1.example.org/groups/grp6) is directly used as a part or an entirety of the virtual fanout URI. For the mapping relationship between the fanout URI (/well-know/grp6) and the member resources m61, m62, and m63 of the group resource Grp6 and the established mapping relationship between the fanout URI (well-know/grp6) and the multicast address ([FF32:30:3FFE:FFFF:1::1233]), reference may be made to Table 2.

Fourth case: Access interfaces of a part of member resources are the same.

For example, when access interfaces of a part of member resources are the same, while access interfaces of other member resources are different, apart from use of the foregoing method, member resources having the same access interface may be grouped into a first group (there may be multiple groups), member resources having different access interfaces are grouped into a second group, and then each group of member resources, multicast addresses, and fanout URIs are mapped according to the foregoing method to form multiple groups of mapping relationships. For each group of member resources, the group server may allocate different multicast addresses separately or allocate the same multicast address. For the latter, it is required that the "fanout URI" of each group should be different.

For example, it is assumed that a group resource Grp7 on the M2M gateway G1 is Grp7=http://g1.example.org/groups/grp7, where member resources included in the group resource Grp7 are respectively m71 on an M2M device D1, m72 on D5, m73 on D6, m74 on D7, m75 on D8, m76 on D9, and m77 on N1:

m71=coap://d1.example.org/xx/aa
m72=coap://d5.example.org/xx/aa
m73=coap://d6.example.org/yy/bb
m74=coap://d7.example.org/yy/bb
m75=coap://d8.example.org/cc
m76=coap://d9.example.org/dd An IPv6 multicast address allocated by the first group server (M2M gateway G1 in FIG. 2-E in this example) to the group resource Grp7 is [FF32:30:3FFE:FFFF:1::1234], and the network connection relationship between devices is shown in FIG. 2-E (that is, all member devices D1, D5, D6, D7, D8, and D9 respectively having the member resources m71, m72, m73, m74, m75, and m76 belong to the M2M gateway G1). Therefore, the member resources (m71, m72) correspond to the same fanout URI "/xx/aa/", and the member resources (m73, m74) correspond to the same fanout URI "/yy/bb/", while a virtual fanout URI, for example, "/well-known/grp7/", needs to be allocated to (m75, m76). Therefore, the mapping relationship established for each member resource of the group resource Grp7 is shown in Table 2, that is, the mapping relationship between the member resources (m71, m72) and the fanout URI (/xx/aa) as well as the mapping relationship between the multicast address ([FF32:30:3FFE:FFFF:1::1234]) and the fanout URI (/xx/aa), the mapping relationship between the member resources (m73, m74) and the fanout URI (/yy/bb) as well as the mapping relationship between the multicast address ([FF32:30:3FFE:FFFF:1::1234]) and the fanout URI (/yy/bb), the mapping relationship between the member resources (m75, m76) and the fanout URI (/well-known/grp7) as well as the mapping relationship between the multicast address ([FF32:30:3FFE:FFFF:1::1234]) and the fanout URI (/well-known/grp7), and the mapping relationship between the member resource (m77), the unicast address ([3FFE:2A00:100:7031::1]), and the fanout URI (/abc).

When a part of member resources do not support multicast: if the group resource further includes member resources not supporting multicast, the member resources not supporting multicast are accessed in a unicast mode one by one according to the prior art, and do not need to be added to the member address mapping table. Certainly, to facilitate unified processing by the group server, unicast access addresses and fanout URIs of these member resources may also be listed in the member address mapping table. In this case, the multicast address column is filled in with the unicast addresses, and the fanout URI column is filled in with the access paths of these member resources on the member devices. For example, it is assumed that the foregoing Grp7 further includes a member m77:

m77=http://n1.example.org/abc

Because m77 can only be accessed through the HTTP and does not support multicast, its mapping relationship is shown in Table 2.

Fifth case: The member resources of the group resource include non-local member resources, and global multicast addresses cannot be allocated.

In a case where the group resource Grp3 described in step 203-3 includes non-local members, the first group server (M2M gateway G1 in FIG. 2-E in this example) may create two groups on D2 and G2 respectively: Grp8 including (m31, m32) and Grp9 including (m33, m34), for example, Grp8=http://d2.example.com/groups/grp8
Grp9=http://g2.example.com/groups/grp9

Because the first group server cannot allocate global multicast addresses to D2 and G2, processing can only be performed in the foregoing manner of not supporting multicast, the multicast address column is filled in with unicast addresses of D2 and G2 respectively, and the fanout URI column is filled in with the group resource URIs of Grp8 and Grp9 respectively (or their access paths on the member devices), as shown in Table 2:

TABLE 2

Group resource mapping table

| Group Resource | Member Resource | Multicast Address | Fallout URI |
| --- | --- | --- | --- |
| Grp5 | m51, m52, m53 | [FF32:30:3FFE:FFFF:1::1232] | / |
| Grp6 | m61, m62, m63 | [FF32:30:3FFE:FFFF:1::1233] | /well-known/grp6 |
| Grp7 | m71, m72 | [FF32:30:3FFE:FFFF:1::1234] | /xx/aa |
|  | m73, m74 | [FF32:30:3FFE:FFFF:1::1234] | /yy/bb |
|  | m75, m76 | [FF32:30:3FFE:FFFF:1::1234] | /well-known/grp7 |
|  | m77 | [3FFE:2A00:100:7031::1] | /abc |
| Grp3 | m31, m32 | [3FFE:2A00:100:7031::2] | /groups/grp8 |
|  | m33, m34 | [3FFE:2A00:100:7031::3] | /groups/grp9 |

In specific implementation, the foregoing group resource mapping tables 1 and 2 may be maintained and operated through an internal general database of the first group server, or registered with a DNS (Domain Name System, domain name system) server, or represented as a RESTful resource. The RESTful resource may be a part of a group resource presentation, as shown in FIG. 2-F.

In FIG. 2-F, <group> is a group resource representation defined in ETSI M2M specification TS 102 690 of the prior art, mainly including a members attribute used to describe the URI of each member resource, a membersContent child resource used to represent all member resources, and other attributes and child resources (which is not described in detail herein in the present invention). A symbol "< >" indicates that an attribute or child resource of the same type may have multiple instances, where a character string name of each instance may be set at will. A requester may modify a group member list by performing operations such as adding, deleting, modifying, or viewing the members attribute, and may also view a member resource list by performing an operation of viewing the members attribute, and may also modify or view all member resources in the group resource by performing operations such as adding/deleting/modifying/viewing the membersContent child resource.

In the embodiment of the present invention, a fanout set <fanoutSet> resource is added in the existing group resource to describe the mapping relationship between the member resources, the fanout URI, and the multicast address for multicast management in the group resource. Each <fanoutSet> may describe the mapping relationship between the fanout URI and the multicast address in Table 1 or Table 2 and the mapping relationship between the member resources and the fanout URI. One <group> resource itself corresponds to one group resource in Table 1 or Table 2, and may include 0 to any plurality of <fanoutSet> child resources. Each <fanoutSet> resource may include the following attributes:

fanoutAddress: corresponding to a multicast address in Table 1 or Table 2.

fanoutURI: corresponding to fanout URI information in Table 1 or Table 2. This attribute is optional in some cases. For example, when one <group> resource includes only one <fanoutSet> resource, and access paths of all member resources on their member devices are the same, the fanout URI may be definitely obtained from the URI of the member resources in the members attribute directly. In this case, this attribute may be omitted. Or, when a uniquely determined group URI is used as the fanout URI, this attribute may also be omitted.

addressType is optional information and used to describe that the address type in fanoutAddress is multicast or unicast, and IPv4 or IPv6, and other information.

memberList is optional information and used to describe the member resource list involved in the group mapping relationship, that is, the member devices having the member resources and the access paths of the member resources on the member devices, namely, the member resources in Table 1. Specifically, when the access paths of all member resources of the group resource on the member devices are the same, all member resources correspond to one multicast address and one fanout URI. Because the members attribute already includes information of all member resources in the group resource, the memberList attribute may not record the information of each member resource again.

It should be noted that there is no strict requirement for the execution sequence of the steps in FIG. 2-C. The process provided in FIG. 2-C is only an relatively exemplary implementation manner. Actually, step 203-2 may be executed before step 203-1, so that a global multicast address other than a local multicast address is allocated preferentially; establishing a mapping relationship between the multicast address and the fanout URI and a mapping relationship between the member resources and the fanout URI in step 203-10 may be completed along with the allocation of a multicast or unicast address in steps 203-4 to 203-9. In addition, every time when the group resource is updated, if composition of the member resources changes (for example, an original member is deleted, or a new member is added), the first group server should also proceed according to the foregoing method, and reallocate a multicast address or update the corresponding mapping relationship according to requirements.

Step 204: The first group server sends, according to the mapping relationship between the multicast address and the fanout URI, a group advertisement for joining a multicast group to the member devices having the member resources, where the group advertisement for joining the multicast group carries the multicast address, so that the member devices having the member resources join, according to the group advertisement for joining the multicast group, the multicast group corresponding to the multicast address.

Specifically, the first group server sends, according to the established mapping relationship between the multicast address and the fanout URI, the group advertisement for joining the multicast group to the member devices supporting multicast. The group advertisement for joining the multicast group carries the allocated multicast address to instruct the member devices supporting multicast to join the multicast group corresponding to the multicast address. For the member devices not supporting multicast, it is unnecessary to send the group advertisement for joining the multicast group. Using a group resource (for example, Grp7) including multiple mapping relationships between multicast addresses and fanout URIs as an example, the first group server needs to respectively send a group advertisement for joining a multicast group to member devices corresponding to member resources in each mapping relationship having a fanout URI. Furthermore, the group advertisement for joining the multicast group may not only includes the multicast address corresponding to the multicast group that the member devices should join, but also includes the mapping relationship between the fanout URI and the member resources.

Specifically, when the access paths of the member resources in the group resource on the member devices are completely the same (for example, Grp4 and Grp5 in Table 1 and Table 2), the group advertisement for joining the multicast group may only need to include multicast address information; when the access paths of the member resources in the group resource on the member devices are not completely the same (for example, Grp6 and Grp7 in Table 2), the group advertisement for joining the multicast group should further include the mapping relationship between the fanout URI and the member resources, so that the member devices having the member resources store the mapping relationship between the fanout URI and the multicast address and the mapping relationship between the member resources and the multicast address.

The group advertisement for joining the multicast group may be sent to the member devices in multiple modes, for example, a preconfigured unicast, multicast, or broadcast mode. Specifically, when the unicast mode is used, the first group server sends, one by one by using a unicast message, a group advertisement for joining a multicast group to unicast addresses (for example, IPv4 or IPv6 unicast addresses) of the member devices having the member resources; when the multicast or broadcast mode is used, the group server sends, by using a multicast or broadcast message, a group advertisement message for joining a multicast group to a pre-agreed multicast or broadcast address (for example, an IPv4 or IPv6 multicast address), and in this case, it is required that the corresponding member devices have joined the multicast/broadcast group corresponding to the specific multicast or broadcast address (for example, implemented by using an IP multicast management protocol such as IGMP or MLD), and that the group advertisement for joining the multicast group should further include identifiers (URIs) of the member devices or URIs of the member resources to instruct the member devices corresponding to the identifiers (URIs) of the member devices or URIs of the member resources to receive and process the group advertisement for joining the multicast group, while other member devices ignore the group advertisement for joining the multicast group.

The embodiment of the present invention does not limit a transmission protocol (for example, HTTP, CoAP, or SIP) used for sending the group advertisement for joining the multicast group in the unicast, multicast, or broadcast mode, and the message format itself may also use different encapsulation modes (for example, XML or binary encoding). The following provides only an exemplary implementation manner of sending a group advertisement for joining a multicast group by using a RESTful request.

To implement the present invention, a member device stores mcGroups resources whose member resources join the multicast group, for storing 0 to any plurality of multicast group resources <mcGroup>, while each <mcGroup> resource describes information of a multicast group that the member device joins. As shown in FIG. 2-G, the <mcGroup> resource includes the following attributes:

mcAddress: a multicast address of the multicast group that the member device joins.

fanoutURI: a fanout URI corresponding to the multicast group that the member device joins.

memberList: a local member resource list corresponding to the fanout URI. It may be a complete URI of member resources or store only access paths of member resources on the member device.

The first group server may send a request for adding, deleting, or modifying the foregoing multicast group resource <mcGroup> to the corresponding member device by using a unicast, multicast, or broadcast RESTful request, thereby implementing the sending of a group advertisement for joining a multicast group.

Specifically, when using a group advertisement for joining a multicast group to instruct a member device to join the multicast group, the first group server performs the following processing:

When the first group server needs to add a member device D1 to a multicast group by using a group advertisement for joining the multicast group, the first group server sends an HTTP POST request to D1 to add one <mcGroup> resource in the mcGroups resource in D1, and carries an mcGroup resource representation in the message body of the POST request:

POST /xxx/mcGroups HTTP/1.1
Host: d1.example.com
{<mcGroup> resource representation}

"/xxx/mcGroups" indicates an access path of the mcGroups resource on D1, and "HTTP/1.1" indicates a protocol version number, while a Host header field carries a domain name or an IP address of D1. If the CoAP supporting multicast is used to send a group advertisement for joining a multicast group, the Host header field may carry an address of a multicast group that D1 joins in advance, and the Host header field and each part of the request message are converted into corresponding fields in the CoAP according to the method of the prior art. Other message header fields or message body content of the POST message unrelated to the present invention is not exhaustively listed.

After successfully receiving the POST request and adding the <mcGroup> resource locally, the member device D1 returns an HTTP success response to the first group server as follows:

HTTP/1.1 201 Created
Location: http://d1.example.com/xxx/mcGroups/mcGrp1
"201 Created" indicates that the requested resource <mcGroup> is added successfully, while a Location header field carries a URI of the added resource on D1, where "mcGrp1" is an instance name of the resource.

In an optional manner, the group server may further directly write an <mcGroup> resource named mcGrp1 into the member device D1 by sending an HTTP PUT request, for example:

PUT /xxx/mcGroups/mcGrp1 HTTP/1.1
Host: d1.example.com
{<mcGroup> resource representation}

The member device D1 directly returns a success response: HTTP/1.1 200 OK.

When using a group advertisement for leaving a multicast group to instruct a member device to leave the multicast group, the first group server may send the group advertisement for leaving the multicast group by using a method similar to sending a group advertisement for joining the multicast group to perform the following processing:

When the first group server needs to use a group advertisement for leaving a multicast group to instruct the member device D1 to leave the multicast group, the first group server sends an HTTP DELETE request to D1, so as to delete an <mcGroup> resource from the mcGroups resource in D1:

DELETE /xxx/mcGroups/mcGrp1 HTTP/1.1
Host: d1.example.com

Other implementation manners of sending a group advertisement for joining or leaving a multicast group:

The first group server may further use other RESTful methods or other protocols (for example, CoAP) to send the foregoing group advertisement for joining or leaving a multicast group. For example, a PUT, POST, or DELETE method is used to directly modify an existing <mcGroup> resource list on a member device (or a part of attributes therein) to indicate an advertisement for instructing the member device to join or leave a multicast group. Specifically, leaving an original multicast group and joining a new multicast group are indicated by replacing the whole <mcGroup> resource; a multicast group address is changed by changing an mcAddress attribute in the <mcGroup> resource; a fanout URI corresponding to the multicast group is changed by changing the fanoutURI attribute in the <mcGroup> resource; or some member resources on the member device are instructed, by adding, deleting, or modifying a member resource list in the memberList, to join or leave a multicast group.

After receiving the group advertisement for joining or leaving a multicast group, the member device should join or leave a corresponding multicast group by using a multicast management protocol such as IGMP or MLD according to the instruction in the group advertisement for joining or leaving a multicast group, and meanwhile, maintain the multicast group resource <mcGroup> stored on the member device, so that a subsequent member resource access request from the group server is processed.

In addition, if the second group server allocates a multicast address in step 203-9, the second group server needs to be regarded as a member device, and the same processing of sending a group advertisement for joining or leaving a multicast group is performed, which is not further described herein.

In addition, after the first group server creates the group resource, the first group server may further receive a group resource update request sent by an application server, for example, a group resource update request for adding member resources, a group resource update request for deleting member resources, or a request for modifying group resource description information.

Specifically, the group resource update request for adding member resources carries the group resource identifier and member resources that need to join the group resource, where the member resources that need to join the group resource include member devices having the member resources and access paths of the member resources on the member devices. After receiving the group resource update request for adding member resources, the first group server determines, according to the group resource identifier, that the access paths of the member resources that need to join the group resource on the member devices are the same as the fanout URI in the mapping relationship between the multicast address and the fanout URI in the group resource corresponding to the group resource identifier, and sends a group advertisement for joining the multicast group to the member devices having the member resources that need to join the group resource, where the group advertisement for joining the multicast group carries the multicast address in the mapping relationship between the multicast address and the fanout URI, so that the member devices having the member resources that need to join the group resource join the multicast group according to the multicast address and receive a member resource access request sent according to the multicast address; or after receiving the group resource update request for adding member resources, the first group server determines, according to the group resource identifier, that the access paths of the member resources that need to join the group resource on the member devices are different from the fanout URI in the mapping relationship between the multicast address and the fanout URI in the group resource corresponding to the group resource identifier; adds the member resources that need to join the group resource to the mapping relationship between the fanout URI and the member resources in the group resource corresponding to the group resource identifier, and sends a group advertisement for joining the multicast group to the member devices having the member resources that need to join the group resource, where the group advertisement for joining the multicast group carries the mapping relationship between the multicast address and the fanout URI in the group resource corresponding to the group resource identifier and the mapping relationship between the fanout URI and the member resources in the group resource corresponding to the group resource identifier, so that upon reception of the access request carrying the fanout URI, the member devices determine, according to the received mapping relationship between the fanout URI and the member resources, the access paths of the member resources on the member devices, and execute a corresponding member resource access request according to the determined access paths of the member resources on the member devices.

If the first group server receives the request for modifying group resource description information, the first group server needs to replace stored, group resource description information according to group description in the request for modifying group resource description information, and update the created group resource according to the updated grouper source description information.

In addition, the group resource update request for deleting member resources carries member resources that need to leave the group resource and the group resource identifier, where the member resources that need to leave the group resource include member devices having the member resources and access paths of the member resources on the member devices. After receiving the group resource update request for deleting member resources, the first group server determines, according to the group resource identifier, the fanout URI corresponding to the member resources that need to leave the group resource, and the mapping relationship between the multicast address and the fanout URI corresponding to the member resources that need to leave the group resource, deletes the member resources that need to leave the group resource from the mapping relationship between the multicast address and the fanout URI corresponding to the member resources that need to leave the group resource, and sends a group advertisement for leaving the multicast group to the member devices having the member resources that need to leave, where the group advertisement for leaving the multicast group carries the multicast address in the mapping relationship between the multicast address and the fanout URI corresponding to the member resources that need to leave the group resource, so that the member devices having the member resources that need to leave leave the multicast group indicated by the multicast address. or where the group resource update request for deleting member resources carries member resources that need to be reserved in the group resource and the group resource identifier, where the member resources that need to be reserved in the group resource include member devices having the member resources and access paths of the member resources on the member devices; determines, according to the group resource identifier, the mapping relationship between the fanout URI and the member resources that need to leave the group resource, uses the member resources that need to be reserved in the group resource to update the member resources in the mapping relationship between the fanout URI and the member resources that need to leave the group resource, and sends a group advertisement for leaving the multicast group to member devices having the member resources that need to leave, where the group advertisement for leaving the multicast group carries the multicast address in the mapping relationship, so that the member devices having the member resources that need to leave the multicast group indicated by the multicast address.

Further, the first group server determines, according to the group resource identifier in the group resource update request for deleting member resources, that the access paths of the member resources that need to leave the group resource on the member devices are different from the fanout URI corresponding to the member resources that need to leave; the group advertisement for leaving the multicast group further includes the fanout URI corresponding to the member resources that need to leave the group resource, so that the member devices having the member resources that need to leave the group resource leave the multicast group indicated by the multicast address, and delete, according to the member resources that need to leave the group resource and the fanout URI in the group advertisement for leaving the multicast group, the member resources in multicast group information corresponding to the group resource identifier in the group resource update request for deleting member resources on the member devices.

Figure 3:
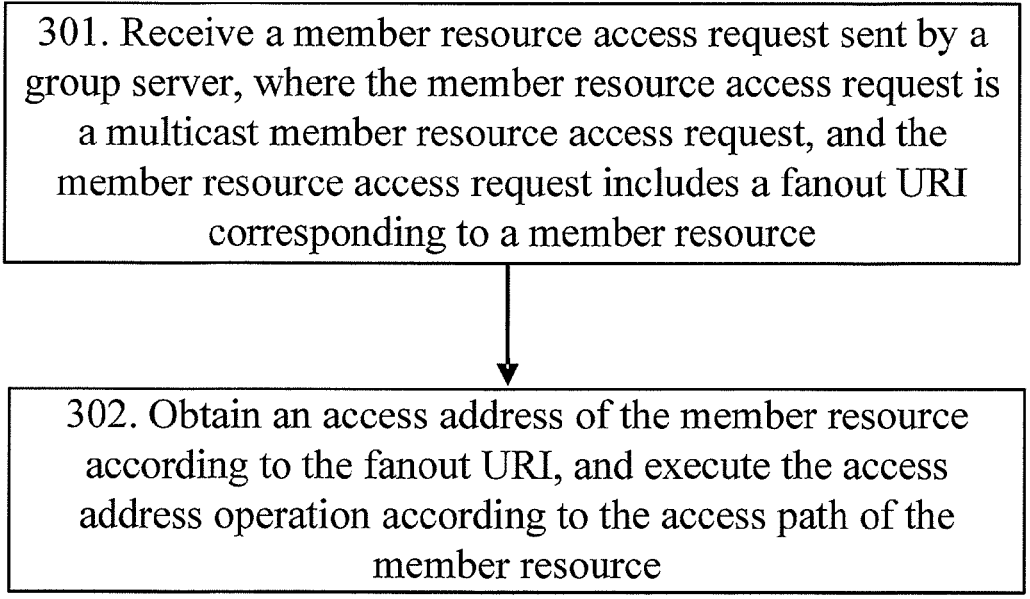
FIG. 3 is a flowchart of a method for accessing member resources according to an embodiment of the present invention.

As shown in FIG. 3, a method for accessing member resources according to an embodiment of the present invention includes the following steps:

Step 301: Receive a member resource access request sent by a group server, where the member resource access request is a multicast member resource access request, and the member resource access request includes a fanout URI corresponding to a member resource.

Specifically, after joining a multicast group, a member device receives a member resource access request sent by a first group server through the multicast group. For information carried in the member resource access request, reference may be made to the description of step 103 and no further details is described herein in the embodiment of the present invention.

In addition, before executing this step, the member device may further receive a group advertisement for joining the multicast group, where the group advertisement for joining the multicast group carries a multicast address, and joins, according to the multicast address, the multicast group corresponding to the multicast address. Specifically, the member device receives the group advertisement sent by the first group server, for joining the multicast group. For the sending, by the first group server, the group advertisement for joining the multicast group, reference may be made to the description of step 204 and no further details is described herein in the embodiment of the present invention.

Step 302: Determine an access path of the member resource on the member device according to the fanout URI, and execute a member resource access request operation according to the access path of the member resource on the member device.

Specifically, after receiving the member resource access request sent by the first group server through the multicast group, the member device obtains, according to the fanout URI carried in the member resource access request, the member resource that is corresponding to the fanout URI and stored by the member device after the member device receives the group advertisement for joining the multicast group in step 204, and executes the member resource access request operation.

In addition, in the foregoing embodiment, after joining the multicast group, the member device having the member resource may further receive a group advertisement for leaving the multicast group, where the group advertisement for leaving the multicast group carries the multicast address; after receiving the group advertisement for leaving the multicast group, the member device deletes stored multicast group information corresponding to the multicast address same as the multicast address in the group advertisement for leaving the multicast group, and leaves the multicast group corresponding to the multicast address in the group advertisement for leaving the multicast group.

Optionally, the group advertisement for leaving the multicast group may further carry the member resource that needs to leave the group resource, where the member resource that needs to leave includes the member device having the member resource that needs to leave the group resource and the access path of the member resource on the member device. After receiving the group advertisement for leaving the multicast group, the member device deletes the stored member resource that needs to leave the group resource in the multicast group information corresponding to the multicast address same as the multicast address in the group advertisement for leaving the multicast group, deletes the stored multicast group information corresponding to the multicast address same as the multicast address in the group advertisement for leaving the multicast group, and leaves the multicast group corresponding to the multicast address in the group advertisement for leaving the multicast group.

In addition, in an optional embodiment, before deleting the stored multicast group information corresponding to the multicast address same as the multicast address in the group advertisement for leaving the multicast group, and leaving the multicast group corresponding to the multicast address in the group advertisement for leaving the multicast group, the member device further needs to determine a stored member resource that does not correspond to the fanout URI in the multicast group information corresponding to the multicast address same as the multicast address in the group advertisement for leaving the multicast group.

As may be known from the embodiment shown in FIG. 3, the member device may receive the member resource access request sent by the first group server through the multicast group, and therefore, the first group server does not need to send the member resource access request to each member device of the multicast group separately, thereby saving network traffic.

FIG. 3-A is a flowchart of a method for processing a received member resource access request by a member device according to an embodiment of the present invention, including the following steps:

Step 302-1: Receive a member resource access request.

Specifically, a member device receives a member resource access request, where the member resource access request may be a unicast member resource access request and may also be a multicast member resource access request.

Step 302-2: The member device determines whether the member resource access request is a multicast request, and if the member resource access request is a multicast request, executes step 302-4, or otherwise, executes step 302-3.

Specifically, the member device parses the member resource access request. If a destination address of the member resource access request is a multicast address, the member resource access request is obtained in multicast mode, that is, it is a multicast request. Otherwise, if the destination address of the member resource access request is a unicast address of the member device, the member resource access request is not obtained in multicast mode, that is, the member resource access request is not a multicast request.

Step 302-3: The member device-directly returns, according to the specific type of a request method, an operation result of the local member resource corresponding to the destination URI in the request. The processing of this step is based on the prior art.

The member resource operation includes at least one of several basic RESTful operation types: create (Create, corresponding to a POST request in the HTTP or CoAP), obtain (Retrieve, corresponding to a GET request in the HTTP or CoAP), update (Update, corresponding to a PUT request in the HTTP or CoAP), and delete (Delete, corresponding to a DELETE request in the HTTP or CoAP). Therefore, corresponding operation results are status response codes indicating whether the foregoing operations are successful, and respectively include information such as a content description of a created child resource, a content description of an obtained resource, a content description of an updated resource, and information about whether a deletion operation is successful.

Step 302-4: The member device determines whether the local multicast group information includes the access path of the member resource indicated by the fanout URI included in the destination URI in the member resource access request on the member device, and if the local multicast group information includes the access path of the member resource indicated by the fanout URI included in the destination URI in the member resource access request on the member device, executes step 302-8, or otherwise, executes step 302-5.

Step 302-5: The member device determines multicast group information of a multicast address same as the destination address in the member resource access request. Reference may be made to the multicast group resource <mcGroup> shown in FIG. 2-G Step 302-6: The member device determines whether the multicast group information corresponding to the multicast address same as the destination address in the member resource access request includes fanout URI information related to the destination URI, and if the multicast group information corresponding to the multicast address same as the destination address in the member resource access request includes fanout URI information related to the destination URI, executes step 302-7, or otherwise, executes step 302-9. The fanout URI related to the destination URI is specifically as follows: The destination URI is the same as the fanout URI in the multicast group information, or the destination URI includes the fanout URI in the multicast group information.

Step 302-7: The member device replaces, according to the access path of the member resource corresponding to the fanout URI in the multicast group information on the member device, the fanout URI part in the destination URI with the access path of the member resource corresponding to the fanout URI in the multicast group information on the member device, and adds a remaining part in the destination URI other than the fanout URI as a suffix to the access path of the member resource on the member device, thereby constructing a request for accessing a local member resource. When multiple access paths of member resources corresponding to the fanout URI exist on the member device, a request for accessing a local member resource needs to be constructed for each member resource.

Step 302-8: The member device operates the member resources according to a method in the member resource access request (for example, HTTP GET/PUT/POST/DELETE), and returns an operation result. The member device may combine operation results of multiple local member resources into one, and returns it to the group server, and may also return multiple operation results respectively.

Step 302-9: The member device discards or ignores the member resource access request.

Specifically, according to the description of FIG. 3-A, assuming that the first group server sends a request for accessing member resources of a group resource Grp4 in Table 1, member devices D1 and D5 receive the same access request as follows because the two devices have joined the multicast group corresponding to the multicast address [FF32:30:3FFE:FFFF:1::1231]:

GET /xxx/temp1/data HTTP/1.1

Host: [FF32:30:3FFE:FFFF:1::1231]

The member devices D1 and D5 search, according to a destination URI "/xxx/temp1/data", for local member resources indicated by the URI, and return corresponding resource content according to a GET request method.

For another example, assuming that the first group server sends, according to the mapping relationship in Table 2 in the embodiment, a request for accessing member resources of a group resource Grp7 in Table 2, member devices D8 and D9 receive the same member resource access request as follows because the two devices have joined the multicast group corresponding to the multicast address [FF32:30:3FFE:FFFF:1::1234]:

GET /well-known/grp7/data HTTP/1.1
Host: [FF32:30:3FFE:FFFF:1::1234]

According to the destination URI "/well-known/grp7", D8 and D9 cannot find member resources whose access paths are "/well-known/grp7" on the member devices, but can find a record including a fanout URI "/well-known/grp7" in the locally stored multicast group resource information, as shown in Table 3. Certainly, the record including the fanout URI "/well-known/grp7" may also be as shown in FIG. 2-G, and is not limited herein in the embodiment of the present invention.

TABLE 3

Member resource mapping table

| <mcGroup> | mcAddress | fanoutURI | memberList |
|---|---|---|---|
| D8 | mcGrpX | [FF32:30:3FFE:FFFF:1::1234] | /well-known/grp7/ | /cc |
| D9 | mcGrpY | [FF32:30:3FFE:FFFF:1::1234] | /well-known/grp7/ | /dd |

Therefore, D8 and D9 respectively replace the fanout URI part in the destination URI with a corresponding record in the local member resource list memberList, thereby constructing corresponding access URIs of the local member resources, which are respectively "/cc/data" and "/dd/data", and then return corresponding resource content according to a GET request method.

Figure 4:
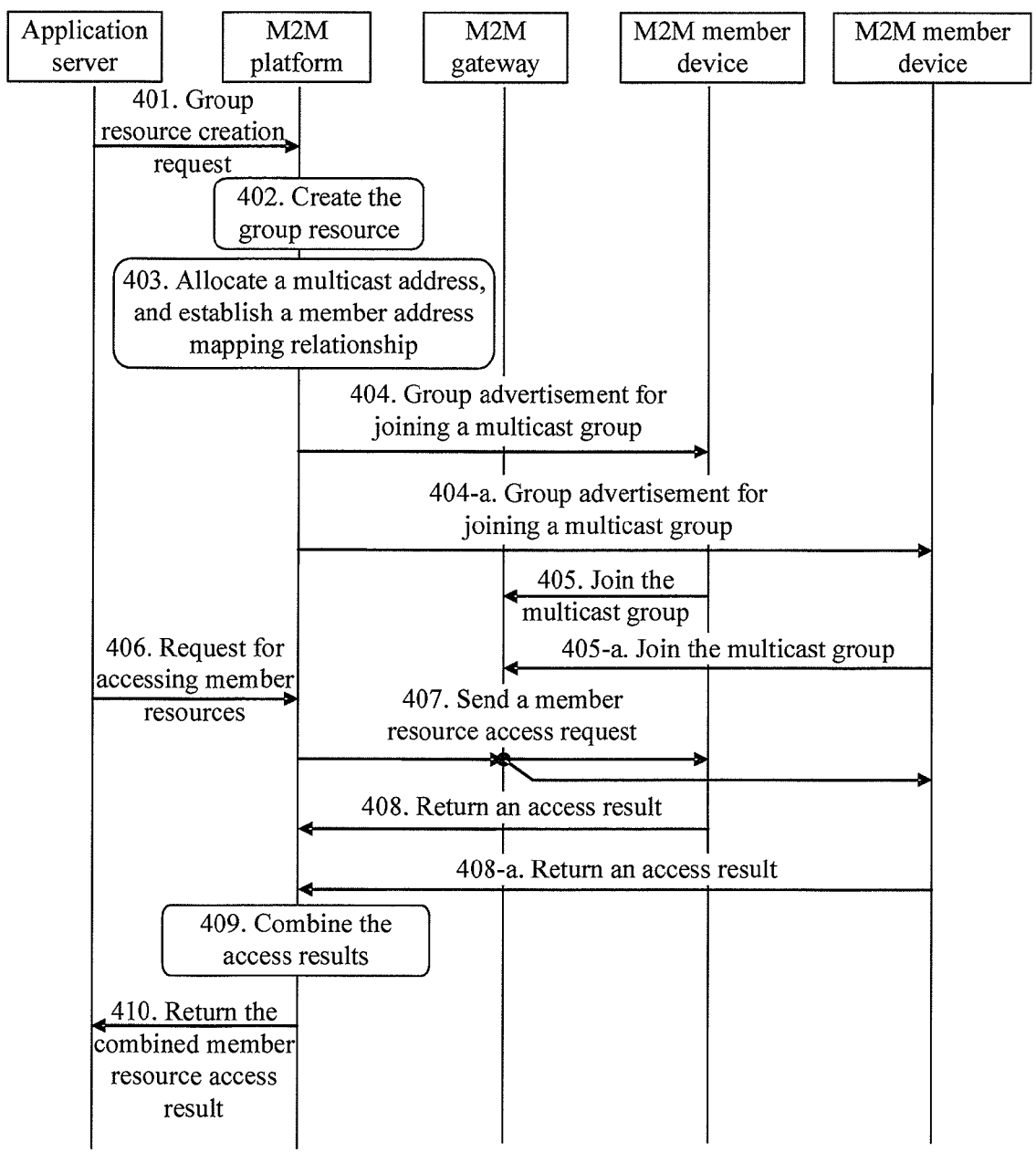
FIG. 4 is a flowchart of a method for accessing member resources by using a directly allocated multicast address according to an embodiment of the present invention.

FIG. 4 is a flowchart of a method for accessing member resources by using a directly allocated multicast address according to an embodiment of the present invention, including the following steps:

Step 401: A network application server NA1 requests to create a group resource Grp10 on an M2M platform N1 (namely, the first group server in the embodiment of the present invention), and sends a group resource creation request to N1. The group resource creation request includes member resources m101 and m102. The member resources m101 and m102 are respectively located on two M2M devices D1 and D2 under an M2M gateway G1.

Step 402: N1 creates the group resource Grp10 locally.

Step 403: N1 analyzes the group resource Grp10 and its member resources m101 and m102, and determines that a multicast group may be created for the member resources m101 and m102. Specifically, for the analyzing, by N1, the group resource Grp10 and its member resources m101 and m102, reference may be made to FIG. 2-A and the corresponding description of the foregoing embodiment and FIG. 2-A, and no further details are provided herein in the embodiment of the present invention.

In addition, N1 allocates a same local or global multicast address to D1 and D2, and establishes a mapping relationship related to the local or global multicast address. Specifically, reference may be made to FIG. 2-C and the corresponding description of the foregoing embodiment and FIG. 2-C, and o further details is provided herein in the embodiment of the present invention.

Steps 404 and 404-a: N1 sends a group advertisement for joining a multicast group to the member devices D1 and D2 to instruct D1 and D2 to join the multicast group corresponding to the multicast address. The group advertisement for joining the multicast group may be sent in unicast mode to D1 and D2 respectively; or may be sent in multicast mode at a time to a multicast group that the member devices D1 and D2 have joined in advance. Specifically, reference may be made to the related description of step 204, and no further details is provided herein in the embodiment of the present invention.

Step 405 and step 405-a: The member devices D1 and D2 use a multicast management protocol such as MLD or IGMP according to the method of the prior art to join the multicast group corresponding to the multicast address indicated in the multicast group advertisement. In this embodiment, assuming that G1 is a local multicast router shared by D1 and D2, D1 and D2 respectively send an MLD/IGMP report command to G1 to join the corresponding multicast group.

Step 406: NA1 sends a request for accessing member resources to N1, asking to access both member resources m101 and m102 in the group resource Grp10. For information carried in the request for accessing member resources, reference may be made to the description of step 101, and no further details is provided herein in the embodiment of the present invention.

Step 407: N1 determines, according to the group resource identifier Grp10, that a mapping relationship is established for the group resource Grp10, constructs a member resource access request, and sends the member resource access request in multicast mode to the multicast address in the mapping relationship (namely, the multicast address). Specifically, for execution of this step, reference may be made to the description of step 102, and no further details is provided herein in the embodiment of the present invention.

Because G1 knows, in steps 405 and 405-a that the member devices D1 and D2 have joined the multicast group corresponding to the multicast address, the multicast access request is forwarded to a local link.

Steps 408 and 408-a: The member devices D1 and D2 receive the multicast access request, and access the local member resources m101 and m102 indicated in the request, and then return access results to N1. Specifically, for this step, reference may be made to FIG. 3-A and the corresponding description of the foregoing embodiment and FIG. 3-A, and no further details is provided herein in the embodiment of the present invention.

Step 409: N1 combines the group member resource access results received from D1 and D2.

Step 410: N1 returns the combined group member resource access result to NA1.

Figure 5:
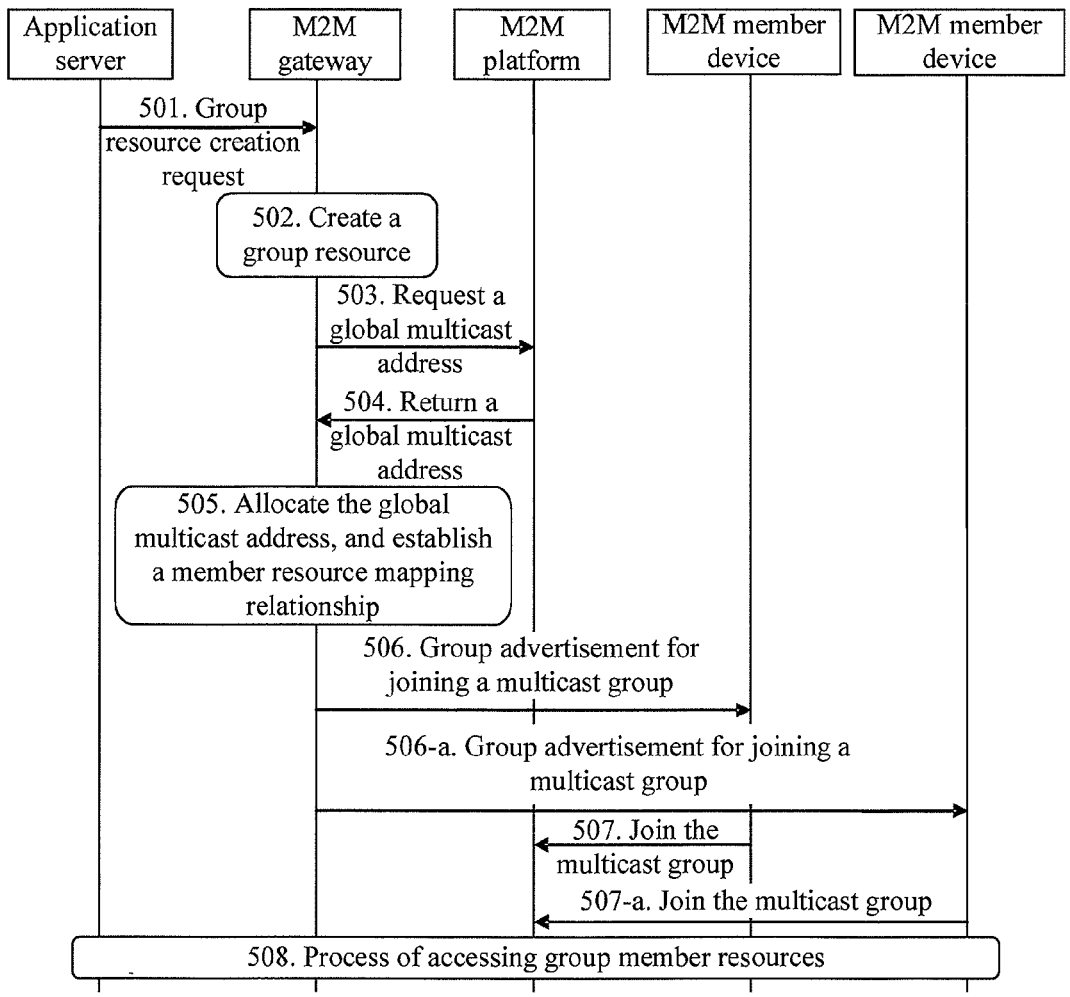
FIG. 5 is a flowchart of a method for accessing member resources by using a requested global multicast address according to an embodiment of the present invention.

FIG. 5 is a flowchart of a method for accessing member resources by using a requested global multicast address according to an embodiment of the present invention, including the following steps:

Step 501: A network application server NA1 requests to create a group resource Grp11 on an M2M gateway G1

(namely, the first group server in the embodiment of the present invention), and sends a group resource creation request to G1. The group resource creation request includes member resources m111 and m112. The member resources m111 and m112 are respectively located on two M2M devices D1 and D2 under an M2M platform N1.

Step 502: The M2M gateway G1 creates the group resource Grp11 locally according to the prior art.

Step 503: The M2M gateway G1 analyzes the group resource Grp11 and its member resources m111 and m112, and determines that a multicast group may be created for the member resources m111 and m112. Specifically, for the analyzing, by the M2M gateway G1, the group resource Grp11 and its member resources mill and m112, reference may be made to FIG. 2-A and the corresponding description of the foregoing embodiment and FIG. 2-A, and no further details is provided herein in the embodiment of the present invention.

In addition, the M2M gateway G1 determines that the member devices D1 and D2 do not belong to the local multicast domain of the M2M gateway G1, and meanwhile, because the M2M gateway G1 cannot directly allocate a global multicast address, the M2M gateway G1 requests the M2M platform N1 (second group server) that is capable of allocating a global multicast address to allocate a global multicast address to D1 and D2. Specifically, reference may be made to the corresponding description of step 203-2 in FIG. 2-C, and no further details is provided herein in the embodiment of the present invention.

Step 504: The M2M platform N1 returns an allocated global multicast address according to the request of G1.

Step 505: The M2M gateway G1 allocates the global multicast address requested from N1 to D1 and D2, and establishes a mapping relationship related to the global multicast address. Specifically, reference may be made to FIG. 2-C and the corresponding description of the foregoing embodiment and FIG. 2-C, and no further details is provided herein in the embodiment of the present invention.

Steps 506 and 506-*a*: The M2M gateway G1 sends a group advertisement for joining a multicast group to the member devices D1 and D2 to instruct D1 and D2 to join the multicast group corresponding to the multicast address. The group advertisement for joining the multicast group may be sent in unicast mode to D1 and D2 respectively; or may be sent in multicast mode at a time to a multicast group that the member devices D1 and D2 have joined in advance. Specifically, reference may be made to the related description of step 204, and no further details is provided herein in the embodiment of the present invention.

Step 507 and step 507-*a*: The member devices D1 and D2 use a multicast management protocol such as MLD or IGMP according to the method of the prior art to join the multicast group corresponding to the multicast address indicated in the multicast group advertisement. In this embodiment, assuming that the M2M gateway G1 is a local multicast router shared by D1 and D2, D1 and D2 respectively send an MLD/IGMP report command to the M2M gateway G1 to join the corresponding multicast group.

Step 508: Change the group resource identifier in steps 406-410 to Grp11, and the member resources to m111 and m112, and others are the same.

Figure 6A:
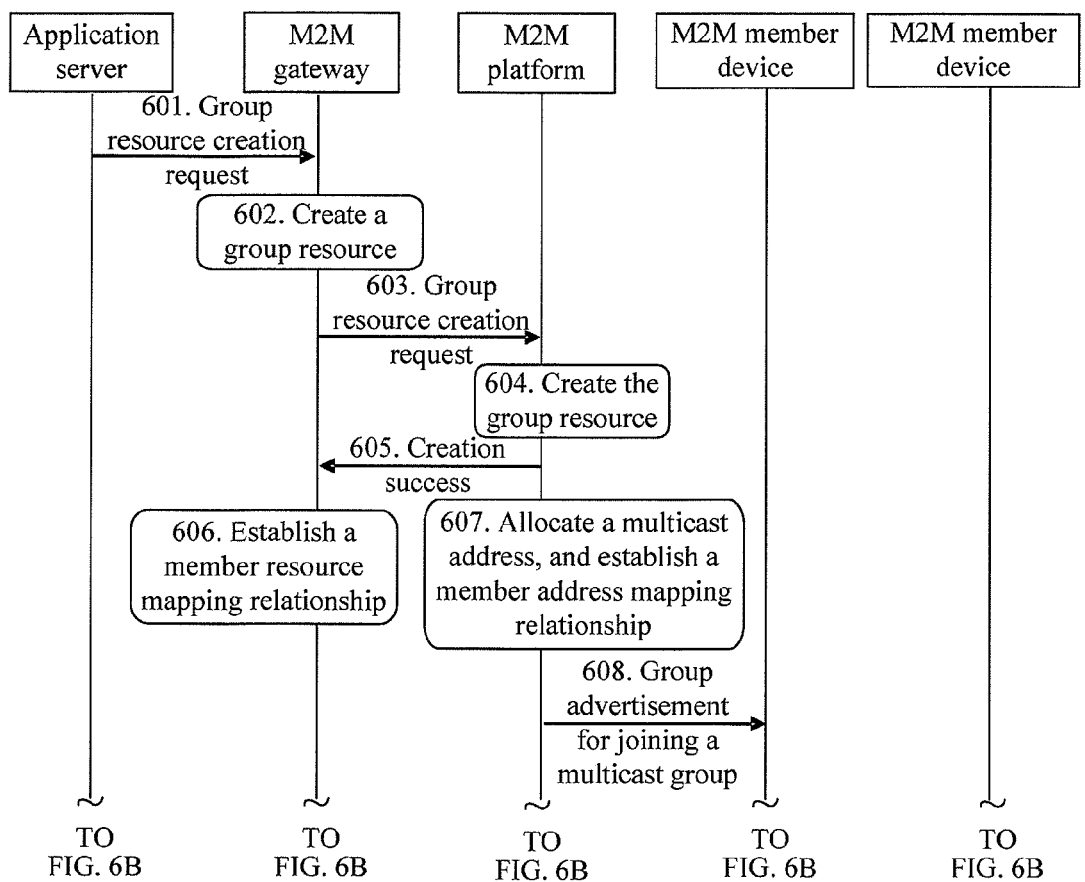
FIG. 6A and FIG. 6B are a flowchart of a method for accessing member resources by using a remotely allocated multicast address according to an embodiment of the present invention.
Figure 6B:
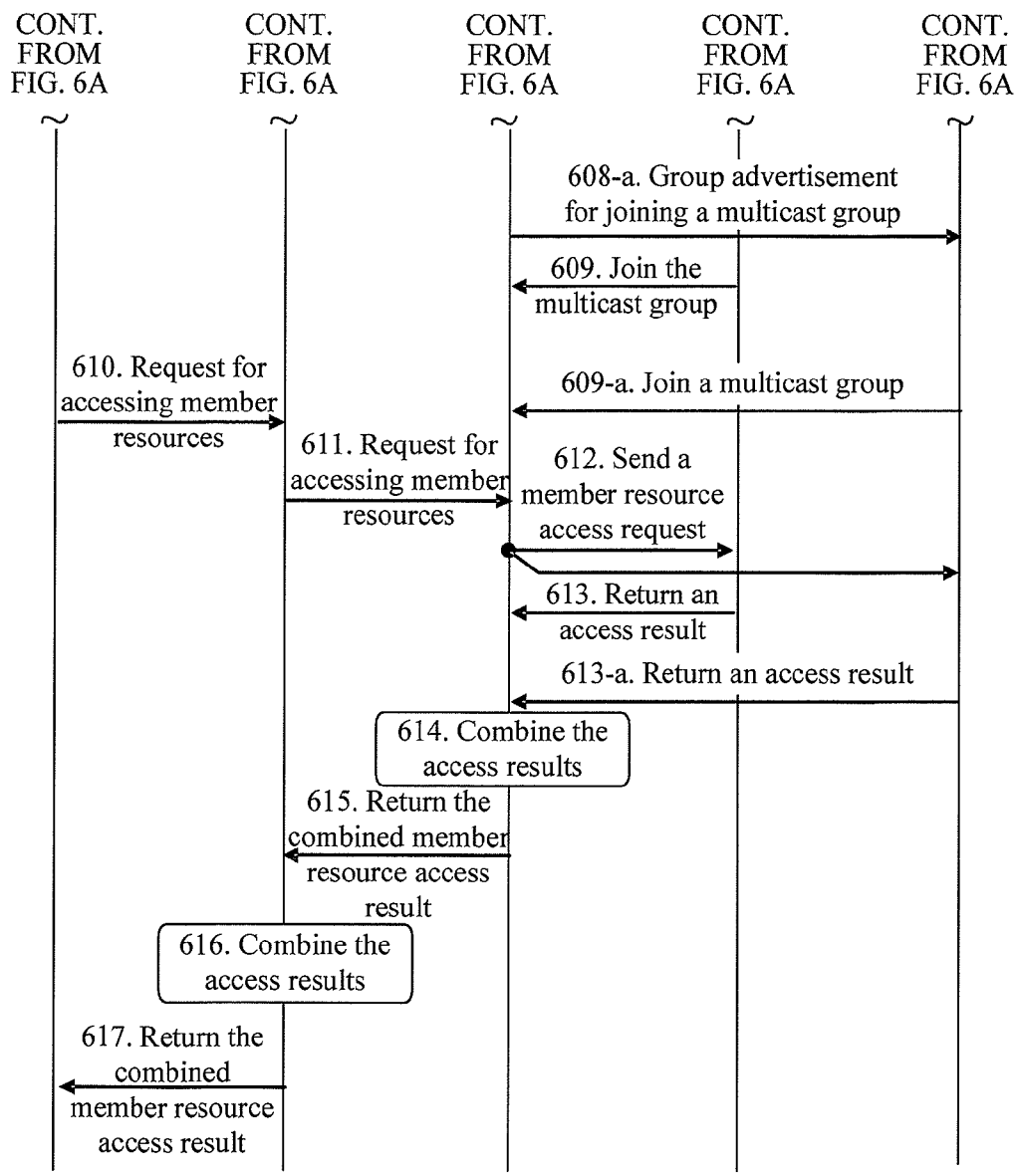

FIG. 6A and FIG. 6B are a flowchart of a method for accessing member resources by using a remotely allocated multicast address according to an embodiment of the present invention, including the following steps:

Steps 601 and 602 are the same as steps 501 and 502, and no further details is provided herein in the embodiment of the present invention.

Step 603: The M2M gateway G1 analyzes the group resource Grp11 and its member resources m111 and m112, and determines that a multicast group may be created for the member resources m111 and m112. Specifically, for the analyzing, by the M2M gateway G1, the group resource Grp11 and its member resources m111 and m112, reference may be made to FIG. 2-A and the corresponding description of the foregoing embodiment and FIG. 2-A, and no further details is provided herein in the embodiment of the present invention.

In addition, the M2M gateway G1 determines that the member devices D1 and D2 having the member resources m111 and m112 belong to the M2M platform N1 (that is, D1 and D2 are registered with N1), and requests to create a second group resource Grp12 on the M2M platform N1 (second group server), where the second group resource Grp12 includes the member resources m111 and m112 on the member devices D1 and D2. In this case, N1 acts as a remote group server (second group server).

Step 604: The M2M platform N1 creates the group resource Grp12 locally according to the prior art.

Step 605: The M2M platform N1 returns a response indicating that the group resource Grp12 is created successfully to the M2M gateway G1, where the response includes an access identifier URI of Grp12.

Step 606: The M2M gateway G1 establishes a mapping relationship for the member resources, and uses the URI of Grp12 as the fanout URI of the member resources mill and m112 in Grp11, and uses the network address of N1 (which may be unicast or multicast address) as the multicast address of the member resources m111 and m112. Optionally, if G1 may allocate a local multicast address to N1, the multicast address in the mapping relationship may be set to the allocated local multicast address. Specifically, reference may be made to the related description of step 203-10, and no further details is provided in the embodiment of the present invention.

Step 607: The M2M platform N1 allocates a same local or global multicast address to the member devices D1 and D2, and establishes a mapping relationship related to the local or global multicast address. Specifically, reference may be made to the related description of FIG. 2-C.

In addition, before allocating the same local or global multicast address to the member devices D1 and D2, the M2M platform N1 further needs to analyze characteristics of the created group resource Grp12 and its member resources m111 and m112, and determine that a multicast group may be created for the member resources. Specifically, reference may be made to FIG. 2-A and the corresponding description of the foregoing embodiment and FIG. 2-A, and no further details is provided herein in the embodiment of the present invention.

It should be noted that the time sequence of step 607 and step 605 is not limited, that is, step 607 may be either performed after step 605 or performed before step 605 and the two steps may also be performed at the same time. No further details is provided herein in the embodiment of the present invention.

Steps 608 and 608-*a*: The M2M platform N1 sends a group advertisement for joining a multicast group to the member devices D1 and D2 to instruct D1 and D2 to join the multicast group corresponding to the multicast address. The group advertisement for joining the multicast group may be sent in unicast mode to D1 and D2 respectively; or may be sent in multicast mode at a time to a multicast group that the member devices D1 and D2 have joined in advance. Specifically, reference may be made to the related description of step 204, and no further details are provided herein in the embodiment of the present invention.

Step 609 and step 609-*a* are the same as step 507 and step 507-*a*, and no further details is provided herein in the present invention.

Step 610: The network application server NA1 sends a request for accessing member resources to the M2M gateway G1, asking to access both member resources m111 and m112 in the group resource Grp11. For information carried in the request for accessing member resources, reference may be made to the description of step 101, and no further details is provided herein in the embodiment of the present invention.

Step 611: The M2M gateway G1 determines, according to the group resource identifier Grp11, that a mapping relationship is established for the group resource Grp11, constructs a first member resource access request, and sends the member resource access request in multicast mode to the multicast address in the mapping relationship (network address of the M2M platform N1). In addition, the fanout URI of the first member resource access request is the URI of Grp11. If Grp11 further includes other local member resources, the M2M gateway G1 may send a unicast or multicast access request to the other local member devices, which is not further described herein.

Step 612: The M2M platform N1 determines, according to the fanout URI of the first member resource access request (URI of Grp11), that a mapping relationship is established for the member resources of Grp11, constructs a second member resource access request according to the established mapping relationship, and then sends the second member resource access request in multicast mode to the multicast address corresponding to Grp11. Specifically, execution of this step is the same as that of step 407, and no further details is provided herein in the embodiment of the present invention.

The description of steps 613-615 is the same as the description of steps 408-410, except that the specific member resources and the member devices sending and receiving messages are different. No further details are provided herein in the embodiment of the present invention.

The description of steps 615-617 is the same as that of steps 409-410. No further details are provided herein in the embodiment of the present invention.

Figure 7:
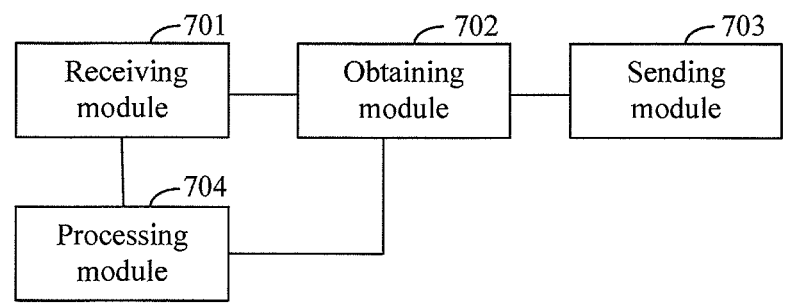
FIG. 7 is a block diagram illustrating a group server according to an embodiment.

FIG. 7 shows a group server according to an embodiment of the present invention. As described in the foregoing, a group server in M2M may be an M2M platform or an M2M gateway and may also be an M2M device. That is, in an M2M network, so long as service middleware exists, any device, gateway, or platform capable of storing and maintaining group resources may act as a group server.

The group server shown in FIG. 7 includes a receiving module 701, an obtaining module 702, a sending module 70.

Specifically, the receiving module 701 is configured to receive a request for accessing member resources, where the request for accessing member resources carries a group resource identifier of a group resource to which the member resources belong; the obtaining module 702 is configured to obtain, according to the group resource identifier, a fanout URI corresponding to the member resources in the group resource and a multicast address corresponding to the fanout URI, where the fanout URI is used to indicate access paths of the member resources on member devices; and the sending module 703 is configured to send, according to the multicast address, a member resource access request to the member devices having the member resources, where a destination URI of the member resource access request includes the fanout URI corresponding to the member resources, so that the member devices having the member resources execute, according to the access paths of the member resources on the member devices as indicated by the fanout URI, an operation indicated by the member resource access request.

Optionally, the receiving module 701 is further configured to receive a group resource creation request, where the group resource creation request carries each member resource, and the member resources include member devices having the member resources and access paths of the member resources on the member devices; and the group server further includes a processing module 704, configured to allocate a multicast address to the member resources according to the member devices having the member resources and the access paths of the member resources on the member devices, and establish a mapping relationship between the multicast address and the fanout URI according to the access paths of the member resources on the member devices.

Optionally, the processing module 704 is specifically configured to allocate a multicast address to member resources having a same access path on the member devices, and establish a mapping relationship between the multicast address and the fanout URI, where the fanout URI is the access path of the member resources on the member devices; and/or configured to allocate a virtual identifier to at least one member resource having a different access path on a member device, allocate a multicast address to the at least one member resource, and establish a mapping relationship between the multicast address and the virtual identifier and a mapping relationship between the virtual identifier and the member resource, and set the virtual identifier to the fanout URI.

Optionally, the sending module 703 is further configured to send, according to the mapping relationship between the multicast address and the fanout URI, a group advertisement for joining a multicast group to the member devices having the member resources, where the group advertisement for joining the multicast group carries the multicast address, so that the member devices having the member resources join, according to the group advertisement for joining the multicast group, the multicast group corresponding to the multicast address.

Optionally, the allocating, by the processing module 704, a multicast address to the member resources according to the member devices having the member resources and the access paths of the member resources on the member devices is specifically as follows: determining, according to the member devices having the member resources, that the member devices having the member resources belong to a first group server, and allocating a multicast address of a local multicast domain to the member devices having the member resources; or determining, according to the member devices having the member resources, that not all member devices having the member resources belong to a first group server, and allocating a multicast address of a global multicast domain to the member devices having the member resources or asking to allocate a multicast address of a remote multicast domain to member devices having the member resources but not belonging to the first group server.

Optionally, the allocating, by the processing module 704, a multicast address of a global multicast domain to the member devices having the member resources is specifically as follows: requesting a multicast address of the global multicast domain from a group server having multicast addresses of the global multicast domain, and allocating the requested multicast address of the global multicast domain to the member devices having the member resources; and the asking to allocate a multicast address of a remote multicast domain to member devices having the member resources but not belonging to the first group server is specifically as follows: determining that the member devices having the member resources but not belonging to the first group server belong to a second group server, and sending a second group resource creation request to the second group server, where the second group resource creation request carries a first group resource identifier and member resources, and the member resources include member devices having the member resources and access paths of the member resources on the member devices, so that the second group server creates a second group resource according to the member devices having the member resources and the access paths of the member resources on the member devices, and allocates a multicast address to the member resources.

Optionally, the allocating, by the processing module 704, a multicast address to the member resources according to the member devices having the member resources is specifically as follows: determining, according to the member devices having the member resources, that the member devices having the member resources and a network to which the member devices belong support multicast, and allocating a multicast address to the member resources; and the processing module 704 is further configured to store member resources corresponding to member devices not having a multicast capability, so that a group server unicasts a request for accessing member resources to the member devices not having the multicast capability.

Optionally, the processing module 704 is further configured to: set a destination address of the request for accessing member resources to the multicast address corresponding to the fanout URI, and set a destination URI of the request for accessing member resources to the fanout URI corresponding to the member resources, so as to generate a member resource access request; and further configured to use the multicast address to send the member resource access request carrying the fanout URI corresponding to the member resources.

Optionally, the processing module 704 is further configured to determine that a destination URI in the request for accessing member resources further includes a suffix; and set a destination address of the request for accessing member resources to the multicast address corresponding to the fanout URI, set the destination URI in the request for accessing member resources to the fanout URI corresponding to the member resources, and add the suffix included in the destination URI to the fanout URI to generate a member resource access request.

Optionally, the receiving module 701 is further configured to receive a group resource update request for adding member resources, where the group resource update request for adding member resources carries the group resource identifier and member resources that need to join the group resource, and the member resources that need to join the group resource include member devices having the member resources and access paths of the member resources on the member devices; and the processing module 704 is further configured to determine, according to the group resource identifier, that the access paths of the member resources that need to join the group resource on the member devices are the same as the fanout URI in the mapping relationship between the multicast address and the fanout URI in the group resource corresponding to the group resource identifier, and send a group advertisement for joining the multicast group to the member devices having the member resources that need to join the group resource, where the group advertisement for joining the multicast group carries the multicast address in the mapping relationship between the multicast address and the fanout URI, so that the member devices having the member resources that need to join the group resource join the multicast group according to the multicast address and receive a member resource access request sent according to the multicast address.

Optionally, the processing module 704 is further configured to determine, according to the group resource identifier, that the access paths of the member resources that need to join the group resource on the member devices are different from the fanout URI in the mapping relationship between the multicast address and the fanout URI in the group resource corresponding to the group resource identifier; add the member resources that need to join the group resource to the mapping relationship between the fanout URI and the member resources in the group resource corresponding to the group resource identifier, and send a group advertisement for joining the multicast group to the member devices having the member resources that need to join the group resource, where the group advertisement for joining the multicast group carries the mapping relationship between the multicast address and the fanout URI in the group resource corresponding to the group resource identifier and the mapping relationship between the fanout URI and the member resource, so that upon reception of the access request carrying the fanout URI, the member devices determine, according to the received mapping relationship between the fanout URI and the member resources, the access paths of the member resources on the member devices, and execute a corresponding member resource access request according to the determined access paths of the member resources on the member devices.

Optionally, the receiving module 701 is further configured to receive a group resource update request for deleting member resources, where the group resource update request for deleting member resources carries member resources that need to leave the group resource and the group resource identifier, and the member resources that need to leave the group resource include member devices having the member resources and access paths of the member resources on the member devices; and the processing module 704 is further configured to determine, according to the group resource identifier, the fanout URI corresponding to the member resources that need to leave the group resource, and the mapping relationship between the multicast address and the fanout URI corresponding to the member resources that need to leave the group resource, delete the member resources that need to leave the group resource from the mapping relationship, and send a group advertisement for leaving the multicast group to the member devices having the member resources that need to leave, where the group advertisement for leaving the multicast group carries the multicast address in the mapping relationship between the multicast address and the fanout URI corresponding to the member resources that need to leave the group resource, so that the member devices having the member resources that need to leave leave the multicast group indicated by the multicast address.

Optionally, the receiving module 701 is further configured to receive a group resource update request for deleting member resources, where the group resource update request for deleting member resources carries member resources that need to be reserved in the group resource and the group resource identifier, and the member resources that need to be reserved in the group resource include member devices having the member resources and access paths of the member resources on the member devices; and the processing module 704 is further configured to determine, according to the group resource identifier, the mapping relationship between the fanout URI and the member resources that need to leave the group resource, use the member resources that need to be reserved in the group resource to update the member resources in the mapping relationship between the fanout URI and the member resources that need to leave the group resource, and send a group advertisement for leaving the multicast group to member devices having the member resources that need to leave, where the group advertisement for leaving the multicast group carries the multicast address in the mapping relationship, so that the member devices having the member resources that need to leave the multicast group indicated by the multicast address.

Optionally, the processing module 704 is further configured to: determine, according to the group resource identifier in the group resource update request for deleting member resources, that the access paths of the member resources that need to leave the group resource on the member devices are different from the fanout URI corresponding to the member resources that need to leave, where the group advertisement for leaving the multicast group further includes the fanout URI corresponding to the member resources that need to leave the group resource, so that the member devices having the member resources that need to leave the group resource leave the multicast group indicated by the multicast address; and delete, according to the member resources that need to leave the group resource and the fanout URI in the group advertisement for leaving the multicast group, the member resources in multicast group information corresponding to the group resource identifier in the group resource update request for deleting member resources.

Figure 8:
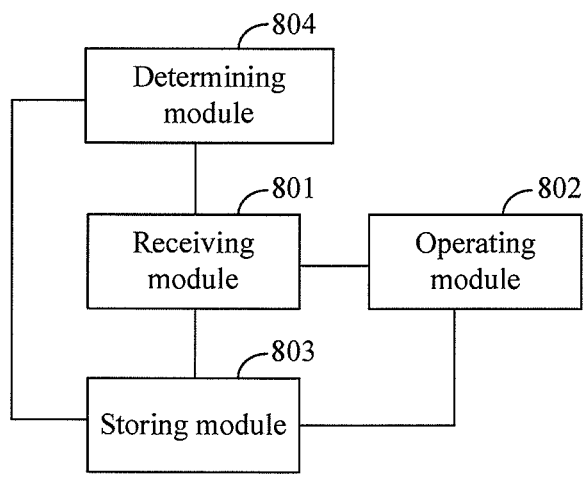
FIG. 8 is a block diagram illustrating a member device according to an embodiment.

FIG. 8 shows a member device according to an embodiment of the present invention. The member device may be an M2M platform or an M2M gateway and may also be an M2M device. That is, in an M2M network, any device, gateway, or platform that stores and maintains resources may act as a member device. Specifically, the member device includes a receiving module 801 and an operating module 802.

Specifically, the receiving module 801 is configured to receive a member resource access request sent by a group server, where the member resource access request is a multicast member resource access request, the member resource access request includes a fanout URI corresponding to the member resource, and the fanout URI is used to indicate an access path of the member resource on the member device; and the operating module 802 is configured to determine, according to the fanout URI, the access path of the member resource on the member device, and execute an access request operation according to the access path of the member resource on the member device.

Optionally, the receiving module 801 is further configured to: receive a group advertisement for joining a multicast group, where the group advertisement for joining the multicast group carries a multicast address; and join, according to the group advertisement for joining the multicast group, the multicast group corresponding to the multicast address.

Optionally, the group advertisement for joining the multicast group further carries a mapping relationship between the fanout URI and the access path of the member resource on the member device, and the member device further includes: a storing module 803, configured to store a mapping relationship between the fanout URI and the multicast address and a mapping relationship between the member resource and the multicast address.

Optionally, the member device further includes: a determining module 804, configured to determine that a destination address of the member resource access request is a multicast address.

Optionally, the determining, by the operating module 802 according to the fanout URI, the access path of the member resource on the member device is specifically as follows: determining multicast group information including a multicast address same as the destination address in the member resource access request, determining that the multicast group information corresponding to the multicast address same as the destination address in the member resource access request includes a fanout URI same as a destination URI in the member resource access request, and determining the access path of the member resource corresponding to the fanout URI in the multicast group information on the member device.

Optionally, the executing, by the operating module 802, an access request operation according to the access path of the member resource on the member device is specifically as follows: replacing the fanout URI included in the destination URI in the member resource access request with the determined access path of the member resource on the member device, and executing an access request operation for the member resource corresponding to the determined access path of the member resource on the member device.

Optionally, the receiving module 801 is further configured to receive a group advertisement for leaving the multicast group, where the group advertisement for leaving the multicast group carries the multicast address; and the storing module 803 is further configured to delete stored multicast group information corresponding to the multicast address same as the multicast address in the group advertisement for leaving the multicast group, and leave the multicast group corresponding to the multicast address in the group advertisement for leaving the multicast group.

Optionally, the receiving module 801 is further configured to receive a group advertisement for leaving the multicast group, where the group advertisement for leaving the multicast group carries the multicast address and the member resource that needs to leave, and the member resource that needs to leave includes the member device having the member resource that needs to leave the group resource and the access path of the member resource on the member device; and the storing module 803 is further configured to delete the stored member resource that needs to leave the group resource in the multicast group information corresponding to the multicast address same as the multicast address in the group advertisement for leaving the multicast group; and delete the stored multicast group information corresponding to the multicast address same as the multicast address in the group advertisement for leaving the multicast group, and leave the multicast group corresponding to the multicast address in the group advertisement for leaving the multicast group.

Further, before deleting the stored multicast group information corresponding to the multicast address same as the multicast address in the group advertisement for leaving the multicast group, and leaving the multicast group corresponding to the multicast address in the group advertisement for leaving the multicast group, the storing module 803 further needs to determine a stored member resource that does not correspond to the fanout URI in the multicast group information corresponding to the multicast address same as the multicast address in the group advertisement for leaving the multicast group.

The implementation manners of processing functions of the modules included in the group server or member device are described earlier in the method embodiments, and therefore not repeated herein. In addition, in an M2M network, an M2M platform may be a computer or a device having a processor. M2M gateways and M2M terminals are not strictly distinguished in terms of devices. For example, a gateway device may also act as a terminal. In addition, various terminal devices, such as mobile phones, computers, PDAs, notebook computers, remote controllers, home appliances, various apparatuses and meters, and sensors, may all act as gateways or terminals in the M2M network. In the foregoing embodiments, the division of various module included is only based on function logic, but the present invention is not limited to the preceding division, so long as corresponding functions can be implemented. In addition, the specific names of the functional module are only used to distinguish the functional units and are not used to limit the protection scope of the present invention. Implementation of the method executed by the member device and functions of various functional modules of the member device may be completed by a processor of the member device, and implementation of the method executed by the group server and functions of various functional modules of the group server may be completed by a processor of the group server.

As may be seen from the technical solutions provided in the embodiments of the present invention, a mapping relationship between an access path of a member resource on a member device and a fanout URI is established, and the fanout URI is included in a member resources access request, so that the member device having the member resource executes, according to the access path of the member resource on the member device as indicated by the fanout URI, an operation indicated by the member resources access request. Therefore, according to a multicast technology and a fanout URI, different member devices can parse a multicast request for accessing member resources, and perform subsequent operations for the access request. Therefore, the group server does not need to unicast the access request to each member device, and network overheads are saved.

The foregoing descriptions are merely exemplary specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for accessing member resources, wherein after creating a group resource,
the method comprises:
  allocating, according to access paths of the member resources on a member device, a virtual identifier to at least two member resources having a different access path;
  allocating a multicast address to at least one member resource of a group resource;
  establishing a mapping relationship between the virtual identifier and the access paths of the member resources on the member device;
  receiving a request for accessing member resources, wherein the request for accessing member resources carries a group resource identifier of the group resource to which the member resources belong;
  obtaining, according to the group resource identifier, a fanout universal resource identifier (URI) corresponding to member resources in the group resource and a multicast address allocated to the group resource, wherein the fanout URI is the virtual identifier and corresponds to the access paths of the member resources on member devices; and
  sending, according to the multicast address, a member resource access request to the member devices having the member resources, wherein a destination URI of the member resource access request comprises the fanout URI corresponding to the access paths of the member resources.

2. The method according to claim 1, before creating a group resource, the method further comprises:
  receiving a group resource creation request, wherein the group resource creation request carries each member resource, and the member resources comprise member devices having the member resources and access paths of the member resources on the member devices.

3. The method according to claim 1, further comprising:
  sending, according to the multicast address, a group advertisement for joining a multicast group to the member devices having the member resources, wherein the group advertisement for joining the multicast group carries the multicast address, so that the member devices having the member resources join, according to the group advertisement for joining the multicast group, the multicast group corresponding to the multicast address.

4. The method according to claim 3, wherein:
  the group advertisement for joining the multicast group further carries a mapping relationship between the virtual identifier and the member resources, so that the member devices having the member resources store the mapping relationship between the virtual identifier and the multicast address and a mapping relationship between the member resources and the multicast address; and
  executing, by the member devices having the member resources, according to the access paths of the member resources on the member devices as indicated by the fanout URI, an operation indicated by the member resource access request comprises: after receiving the access request carrying the fanout URI, determining, by the member devices having the member resources, according to the received fanout URI and the mapping relationship between the virtual identifier and the member resources, the access paths of the member resources on the member devices, and executing, according to the determined access paths of the member resources on the member devices, an operation indicated by the member resource access request.

5. The method according to claim 1, wherein after obtaining, according to the group resource identifier, the fanout URI corresponding to the member resources in the group resource and the multicast address, the method further comprises:
  setting a destination address of the request for accessing member resources to the multicast address, and setting a destination URI of the request for accessing member resources to the fanout URI corresponding to the member resources to generate a member resource access request; and using the multicast address to send the member resource access request carrying the fanout URI corresponding to the member resources.

6. The method according to claim 1, wherein after obtaining, according to the group resource identifier, the fanout URI corresponding to the member resources in the group resource and the multicast address, the method further comprises:

determining that a destination URI in the request for accessing member resources further comprises a suffix; and setting a destination address of the request for accessing member resources to the multicast address, setting the destination URI to the fanout URI corresponding to the member resources, and adding the suffix comprised in the destination URI to the fanout URI to generate a member resource access request.

7. The method according to claim 2, further comprising:

receiving a group resource update request for adding member resources, wherein the group resource update request for adding member resources carries the group resource identifier and member resources that need to join the group resource, and the member resources that need to join the group resource comprise member devices having the member resources and access paths of the member resources on the member devices; and determining, according to the group resource identifier, that the access paths of the member resources that need to join the group resource on the member devices are different from the fanout URI in the mapping relationship between the multicast address and the fanout URI in the group resource corresponding to the group resource identifier; adding the member resources that need to join the group resource to the mapping relationship between the fanout URI and the member resources in the group resource corresponding to the group resource identifier, and sending a group advertisement for joining the multicast group to the member devices having the member resources that need to join the group resource, wherein the group advertisement for joining the multicast group carries the mapping relationship between the multicast address and the fanout URI in the group resource corresponding to the group resource identifier and the mapping relationship between the fanout URI and the member resources in the group resource corresponding to the group resource identifier, so that upon reception of the access request carrying the fanout URI, the member devices determine, according to the received mapping relationship between the fanout URI and the member resources, the access paths of the member resources on the member devices, and execute a corresponding member resource access request according to the determined access paths of the member resources on the member devices.

8. A method for accessing member resources, the method comprising:

receiving a member resource access request sent by a group server, wherein the member resource access request is a multicast member resource access request, and the member resource access request comprises a fanout uniform resource identifier URI corresponding to a member resource; wherein a mapping relationship between the fanout URI and an access path of the member resources of the group resource is stored, and the fanout URI is allocated to at least two member resources having a different access path; and determining, according to the mapping relationship between the fanout URI and the access path of the member resources of the group resource, the access path of the member resource on the member device;

replacing the fanout URI comprised in a destination URI in the member resource access request with the determined access path of the member resource on the member device, and executing an access request operation for the member resource corresponding to the determined access path of the member resource on the member device.

9. The method according to claim 8, further comprising:

receiving a group advertisement for joining a multicast group, wherein the group advertisement for joining the multicast group carries a multicast address, and joining, according to the group advertisement for joining the multicast group, the multicast group corresponding to the multicast address.

10. The method according to claim 9, wherein the group advertisement for joining the multicast group carries a mapping relationship between the fanout URI and the member resource, and the method further comprises:

storing the mapping relationship between the access path of the member resources of the group resource and the fanout URI, and a mapping relationship between the member resource and the multicast address.

11. The method according to claim 8, further comprising:

receiving a group advertisement for leaving the multicast group, wherein the group advertisement for leaving the multicast group carries the multicast address corresponding to the multicast group that the member resource needs to leave and the member resource that needs to leave the group resource, and the member resource that needs to leave comprises the member device having the member resource that needs to leave the group resource and the access path of the member resource on the member device;

deleting the stored member resource that needs to leave the group resource in the multicast group information corresponding to the multicast address same as the multicast address in the group advertisement for leaving the multicast group; and deleting the stored multicast group information corresponding to the multicast address same as the multicast address in the group advertisement for leaving the multicast group, and leaving the multicast group corresponding to the multicast address in the group advertisement for leaving the multicast group.

12. A computer program product comprising computer executable instructions stored on a non-transitory computer readable medium such that when the computer executable instructions are executed by a computer program processor to apply a group resource access, the computer program product performs the steps of:

after creating a group resource, allocating, according to access paths of the member resources on the member device, a virtual identifier to at least two member resources having a different access path;

allocating a multicast address to the at least one member resource of the group resource;

establishing a mapping relationship between the virtual identifier and the access path of the member resources on the member device;

receiving a request for accessing member resources, wherein the request for accessing member resources carries a group resource identifier of the group resource to which the member resources belong;

obtaining, according to the group resource identifier, a fanout universal resource identifier URI corresponding to member resources in the group resource and a multicast address allocated to the group resource, wherein the fanout URI is the virtual identifier and corresponds to the access paths of the member resources on member devices; and sending, according to the multicast address, a member resource access request to the member devices having the member resources, wherein a destination URI of the member resource access request comprises the fanout URI corresponding to the access paths of the member resources.

13. A group server for accessing member resources, comprising:

a storage device storing computer executable program codes;

a communication interface; and a processor, coupled with the storage device and the communication interface;

wherein the program codes comprise instructions which, when executed by the processor, cause the group server to:

after creating a group resource, allocate, according to access paths of the member resources on the member device, a virtual identifier to at least two member resources having a different access path;

allocate a multicast address to the at least one member resource of the group resource;

establish a mapping relationship between the virtual identifier and the access path of the member resources on the member device;

receive a request for accessing member resources, wherein the request for accessing member resources carries a group resource identifier of the group resource to which the member resources belong;

obtain, according to the group resource identifier, a fanout universal resource identifier URI corresponding to member resources in the group resource and a multicast address allocated to the group resource, wherein the fanout URI is the virtual identifier and corresponds to the access paths of the member resources on member devices; and send, according to the multicast address, a member resource access request to the member devices having the member resources, wherein a destination URI of the member resource access request comprises the fanout URI corresponding to the access paths of the member resources.

14. A member device, comprising:

a storage device storing computer executable program codes;

a communication interface; and a processor, coupled with the storage device and the communication interface;

wherein the program codes comprise instructions which, when executed by the processor, cause the member device to:

receive a member resource access request sent by a group server, wherein the member resource access request is a multicast member resource access request, and the member resource access request comprises a fanout uniform resource identifier URI corresponding to a member resource; wherein a mapping relationship between the fanout URI and the access path of the member resources of the group resource is stored, and the fanout URI is allocated to at least two member resource having a different access path;

determine, according to the mapping relationship between the fanout URI and the access path of the member resources of the group resource, the access path of the member resource on the member device; and replace the fanout URI comprised in a destination URI in the member resource access request with the determined access path of the member resource on the member device, and execute an access request operation for the member resource corresponding to the determined access path of the member resource on the member device.

15. A computer program product comprising computer executable instructions stored on a non-transitory computer readable medium such that when the computer executable instructions are executed by a computer program processor to apply a device management, the computer program product performs the steps of:

receiving a member resource access request sent by a group server, wherein the member resource access request is a multicast member resource access request, and the member resource access request comprises a fanout uniform resource identifier URI corresponding to a member resource; wherein a mapping relationship between the fanout URI and the access path of the member resources of the group resource is stored, and the fanout URI is allocated to at least two member resource having a different access path;

determining, according to the mapping relationship between the fanout URI and the access path of the member resources of the group resource, the access path of the member resource on the member device; and replacing the fanout URI comprised in a destination URI in the member resource access request with the determined access path of the member resource on the member device, and executing an access request operation for the member resource corresponding to the determined access path of the member resource on the member device.

* * * * *